US012700970B2

(12) United States Patent
Zhang

(10) Patent No.: US 12,700,970 B2
(45) Date of Patent: Aug. 4, 2026

(54) METHOD FOR DETERMINING FREQUENCY-DOMAIN RESOURCE POSITION, TERMINAL, AND STORAGE MEDIUM

(71) Applicant: SPREADTRUM COMMUNICATIONS (SHANGHAI) CO., LTD., Shanghai (CN)

(72) Inventor: Meng Zhang, Beijing (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 367 days.

(21) Appl. No.: 18/554,089

(22) PCT Filed: Dec. 14, 2021

(86) PCT No.: PCT/CN2021/137990
§ 371 (c)(1),
(2) Date: Oct. 5, 2023

(87) PCT Pub. No.: WO2022/213653
PCT Pub. Date: Oct. 13, 2022

(65) Prior Publication Data
US 2024/0372668 A1 Nov. 7, 2024

(30) Foreign Application Priority Data
Apr. 6, 2021 (CN) .......................... 202110370133.8

(51) Int. Cl.
*H04L 5/00* (2006.01)

(52) U.S. Cl.
CPC .......... *H04L 5/0051* (2013.01); *H04L 5/0012* (2013.01)

(58) Field of Classification Search
CPC . H04L 5/0012; H04L 5/0048; H04L 25/0224; H04L 25/0226; H04W 72/23; H04B 1/713
See application file for complete search history.

(56) References Cited

U.S. PATENT DOCUMENTS

2021/0083825 A1* 3/2021 Choi ..................... H04L 5/0023
2021/0226752 A1* 7/2021 Choi ..................... H04W 72/21
(Continued)

FOREIGN PATENT DOCUMENTS

CN 107889256 A 4/2018
CN 108702634 A 10/2018
(Continued)

OTHER PUBLICATIONS

OPPO, Enhancements on SRS flexibility, coverage and capacity, 3GPP TSG RAN WG1 #104-e, R1-2100123, Feb. 5, 2021. sections 2, 4, 6.
(Continued)

*Primary Examiner* — Shukri Taha
(74) *Attorney, Agent, or Firm* — JCIPRNET

(57) ABSTRACT

A method for determining a frequency-domain resource position, a terminal, and a storage medium are provided in implementations of the disclosure. The method includes the following. A network device sends configuration information for a sounding reference signal (SRS) resource to the terminal, where the configuration information includes L first configuration parameters, each first configuration parameter is used for configuring an SRS partial sounding transmission on the SRS resource of the terminal, and L is an integer greater than or equal to 1. The terminal receives from the network device the configuration information for the SRS resource. The terminal determines, based on the configuration information including the first configuration (Continued)

10 parameter, the frequency-domain position in the SRS resource for transmitting the SRS.

17 Claims, 5 Drawing Sheets

(56)                    References Cited

U.S. PATENT DOCUMENTS

| | | | | |
|---|---|---|---|---|
| 2022/0209908 A1* | 6/2022 | Qin | .......................... | H04J 11/00 |
| 2024/0031099 A1* | 1/2024 | Abdelghaffar | .... | H04W 72/0446 |
| 2024/0048310 A1* | 2/2024 | Gong | ................... | H04L 5/0012 |

FOREIGN PATENT DOCUMENTS

| | | |
|---|---|---|
| CN | 109802810 A | 5/2019 |
| CN | 111769919 A | 10/2020 |

OTHER PUBLICATIONS

WIPO, International Search Report and Written Opinion for International Application No. PCT/CN2021/137990, Mar. 9, 2022.
The first office action issued in corresponding CN application No. 202110370133.8 dated Apr. 29, 2023.

* cited by examiner

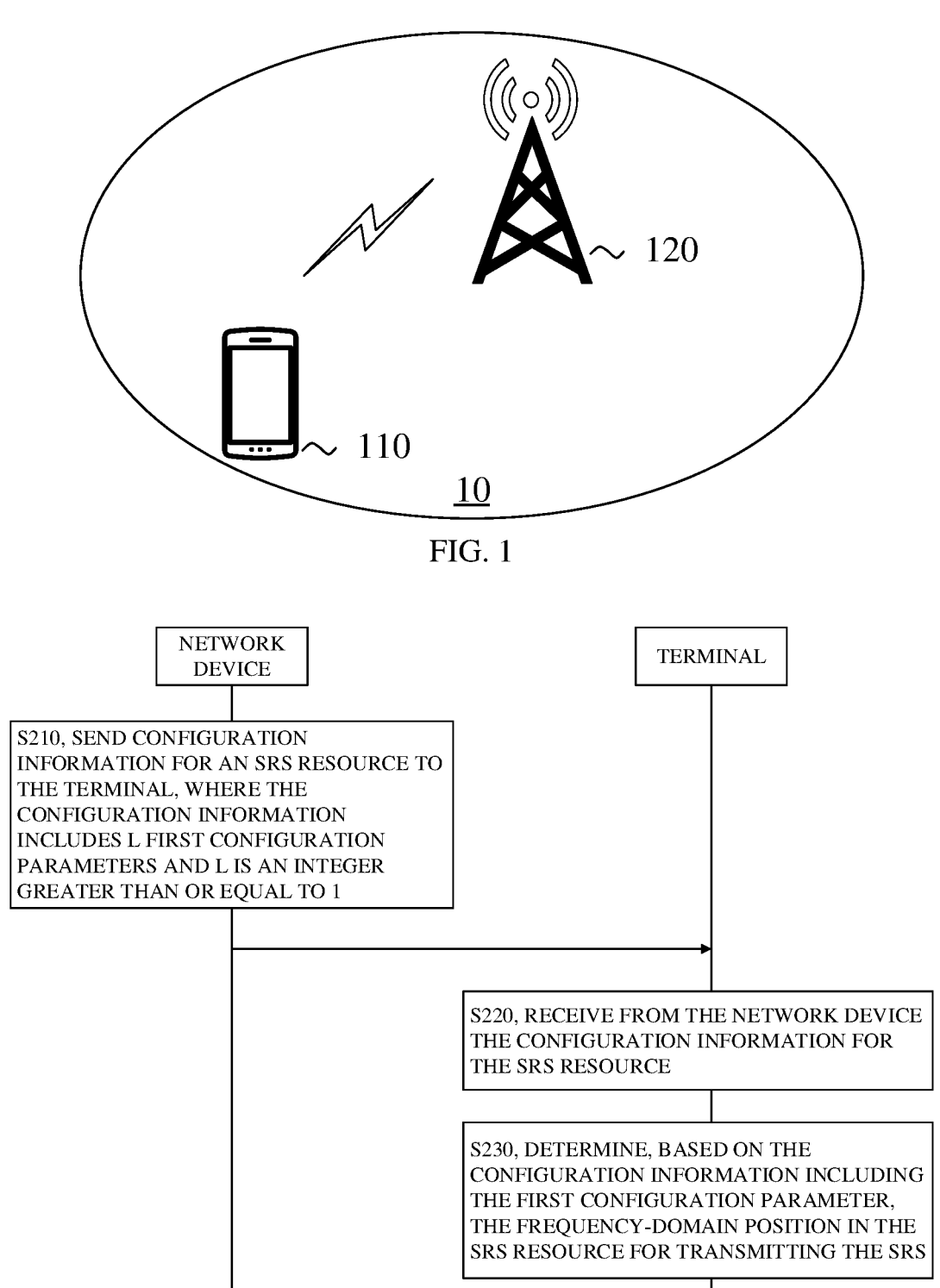

FIG. 1

| NETWORK DEVICE | | TERMINAL |
|---|---|---|

S210, SEND CONFIGURATION INFORMATION FOR AN SRS RESOURCE TO THE TERMINAL, WHERE THE CONFIGURATION INFORMATION INCLUDES L FIRST CONFIGURATION PARAMETERS AND L IS AN INTEGER GREATER THAN OR EQUAL TO 1

S220, RECEIVE FROM THE NETWORK DEVICE THE CONFIGURATION INFORMATION FOR THE SRS RESOURCE

S230, DETERMINE, BASED ON THE CONFIGURATION INFORMATION INCLUDING THE FIRST CONFIGURATION PARAMETER, THE FREQUENCY-DOMAIN POSITION IN THE SRS RESOURCE FOR TRANSMITTING THE SRS

FIG. 2

METHOD FOR DETERMINING FREQUENCY-DOMAIN RESOURCE POSITION, TERMINAL, AND STORAGE MEDIUM

CROSS-REFERENCE TO RELATED APPLICATION(S)

This application is a National Stage of International Application No. PCT/CN2021/137990, field on Dec. 14, 2021, which claims priority to Chinese Patent Application No. 202110370133.8, filed on Apr. 6, 2021, both of which are incorporated by reference herein.

TECHNICAL FIELD

This disclosure relates to the field of communication technology, in particular to a method for determining a frequency-domain resource position, a terminal, and a storage medium.

BACKGROUND

The 3rd generation partnership project (3GPP) is dedicated to the development of communication protocol standards. The related communication protocol standards have recorded the sounding reference signal (SRS).

At present, for the frequency-hopping spread spectrum (FHSS) technology supported by the new radio (NR) system, the SRS needs to be transmitted over the whole band resource. Meanwhile, to obtain better coverage performance of the uplink transmission, for the SRS resources configured by the network, only a part of the SRS resources in the frequency-domain can be selected for transmitting the SRS, which is beneficial to improving the power spectral density (PSD) of the transmit power of the SRS and can further obtain better coverage performance. Thus, such transmission mode can be called the partial sounding transmission. As can be seen, based on the related communication protocol standards, it is necessary to deeply study the frequency-domain resource position of the SRS resource in the partial sounding transmission, to further improve the utilization efficiency and coverage performance of the band resource and enhance the multiplexing capability of the SRS.

SUMMARY

In a first aspect, embodiments of the disclosure provide a method for determining a frequency-domain resource position. The method includes: obtaining, by a terminal, configuration information for a sounding reference signal (SRS) resource, where the configuration information includes L first configuration parameters, each first configuration parameter is used for configuring an SRS partial sounding transmission on the SRS resource of the terminal, and L is an integer greater than or equal to 1; and determining, by the terminal based on the configuration information including the first configuration parameter, a frequency-domain position in the SRS resource for transmitting an SRS.

In a second aspect, embodiments of the disclosure provide a terminal. The terminal includes a processor and a memory coupled to the processor and storing one or more programs. The one or more programs are configured to be executed by the processor to perform operations in the first aspect of the embodiments of the disclosure.

In a third aspect, embodiments of the disclosure provide a non-transitory computer-readable storage medium. The computer-readable storage medium stores a computer program, where the computer program, when executed by a terminal, causes the terminal to perform operations as described in the first aspect of the embodiments of the disclosure.

BRIEF DESCRIPTION OF THE DRAWINGS

To more clearly explain technical solutions in embodiments of the disclosure, a brief introduction will be given below to drawings to be used in the description of the embodiments or the related art. Apparently, the drawings described below are only some embodiments of the disclosure, and other drawings may be obtained from these drawings without creative effort for those of ordinary skill in the art.

FIG. 1 is a schematic diagram of an architecture of a wireless communication system provided in embodiments of the disclosure.

FIG. 2 is a schematic flow chart of a method for determining a frequency-domain resource position provided in embodiments of the disclosure.

DETAILED DESCRIPTION

Figure 3:
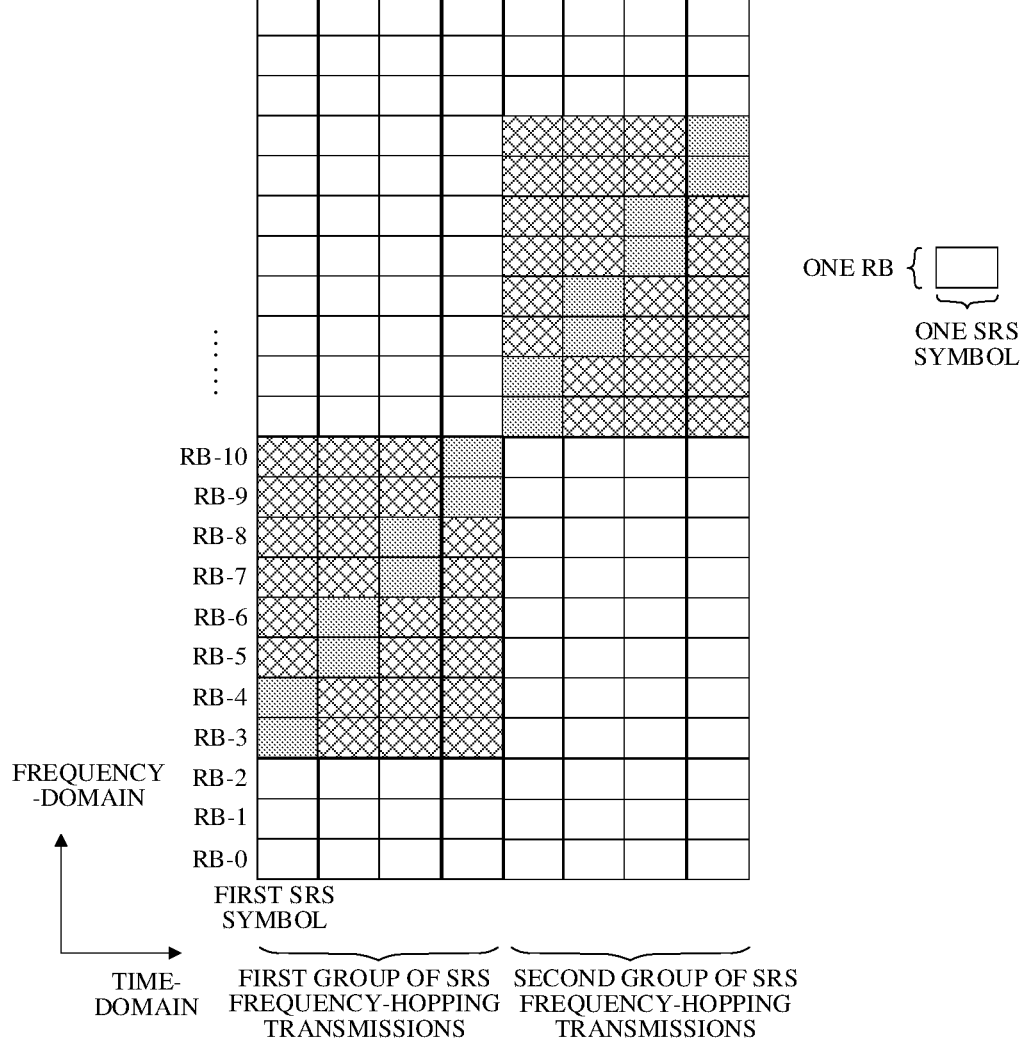
FIG. 3 is a schematic structural diagram of frequency-domain positions of multiple RBs on each SRS symbol in each group of SRS frequency-hopping transmissions provided in embodiments of the disclosure.

In order for those in the art to better understand technical solutions of the disclosure, the technical solutions in embodiments of the disclosure will be described below with reference to the drawings in embodiments of the disclosure. Apparently, the described embodiments are part of and not all of the embodiments of the disclosure. With respect to the embodiments in the disclosure, all other embodiments obtained by those of ordinary skill in the art without creative efforts fall within the scope of protection of the disclosure.

The terms "first", "second", etc. in the specification and claims of the disclosure and the above drawings are used to distinguish different objects and are not used to describe a specific order. Furthermore, the terms "including" and "having" and any variations thereof are intended to cover non-exclusive inclusion. For example, a process, method, software, product, or device that includes a series of steps or units is not limited to the listed steps or units, but also includes steps or units that are not listed, or other steps or units that are inherent to these processes, methods, products, or devices.

The "embodiment" herein means that specific features, structures, or characteristics described in conjunction with the embodiments may be included in at least one embodiment of the disclosure. This phrase occurred in various positions in the specification does not necessarily refer to the same embodiment nor is it a separate or alternative embodiment that is mutually exclusive to other embodiments. It is explicitly and implicitly understood by those skilled in the art that the embodiments described herein may be combined with other embodiments.

It should be noted that "connection" in embodiments of the disclosure refers to various connection modes such as direct connection or indirect connection to realize communication between devices, without any limitation. The "network" and "system" in embodiments of the disclosure express the same concept, and the communication system is the communication network.

The technical solution of the embodiments of the disclosure can be applied to various wireless communication systems, such as: global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, evolved system of the NR system, LTE-based access to unlicensed spectrum (LTE-U) system, NR-based access to unlicensed spectrum (NR-U) system, non-terrestrial network (NTN) system, universal mobile telecommunications system (UMTS), wireless local area network (WLAN), wireless fidelity (WiFi), 6th generation (6G) system, or others communication system, etc.

It should be noted that the traditional wireless communication system supports a limited number of connections and is easy to be implemented. However, with the development of communication technology, the wireless communication system can not only support the traditional wireless communication system, but also support device to device (D2D) communication, machine to machine (M2M) communication, machine type communication (MTC), vehicle to vehicle (V2V) communication, vehicle to everything (V2X) communication, narrow band internet of things (NB-IoT) communication, etc. Therefore, the technical solutions of the embodiments of the disclosure can also be applied to the wireless communication system.

Optionally, the wireless communication system of the embodiments of the disclosure may be applied to beamforming, carrier aggregation (CA), dual connectivity (DC), or standalone (SA) deployment scenarios, etc.

Optionally, the wireless communication system of the embodiments of the disclosure may be applied to the unlicensed spectrum. The unlicensed spectrum can also be considered as the shared spectrum. Alternatively, the wireless communication system in the embodiment can also be applied to the licensed spectrum. The licensed spectrum can also be considered as the non-shared spectrum.

Since the embodiments of the disclosure may be described in conjunction with the terminal and network device, a specific description of the terminal and network device concerned will be made below.

Specifically, the terminal may be a user equipment (UE), a remote UE, a relay UE, an access terminal, a user unit, a user station, a mobile station, a mobile radio station, a remote station, a mobile device, a user terminal, a smart terminal, a wireless communication device, a user agent, or a user device. It should be noted that the relay device is a terminal capable of providing relay forwarding services for other terminals (including remote terminals). In addition, the terminal may be a cellular telephone, a cordless telephone, a session initiation protocol (SIP) telephone, a wireless local loop (WLL) station, a personal digital assistant (PDA), a handheld device and a computing device with wireless communication functions or other processing device connected to a wireless modem, a vehicle-mounted device, a wearable device, a terminal in a next generation communication system (e.g., an NR communication system), or a terminal in a future evolved public land mobile network (PLMN), etc., which is not limited.

Further, the terminal can be deployed on land, including indoor or outdoor, hand-held, wearable, or vehicle-mounted. The terminal can be deployed on the water (such as ships, etc.). The terminal can be deployed in the air (such as airplanes, balloons, and satellites, etc.).

Further, the terminal may be a mobile phone, a tablet computer (Pad), a computer with a wireless transceiver function, a virtual reality (VR) terminal device, an augmented reality (AR) terminal device, a wireless terminal device in industrial control, a wireless terminal device in self-automatic-driving, a wireless terminal device in remote medical, a wireless terminal device in smart grid, a wireless terminal device in transportation safety, a wireless terminal device in smart city, a wireless terminal device in smart home, and the like.

Further, the terminal may include a device with a transceiver function, such as a chip system. The chip system may include a chip, and may also include other separate devices.

Specifically, the network device may be a device for communicating with the terminal, and is responsible for radio resource management (RRM), quality of service (QOS) management, data compression and encryption, data transmission and reception, and the like at the air interface side. The network device may be a base station (BS) in the communication system or a device deployed in the radio access network (RAN) for providing the wireless communication function. For example, a base transceiver station (BTS) in the GSM or CDMA communication system, a node B (NB) in the WCDMA communication system, an evolutional node B (eNB or eNodeB) in the LTE communication system, a next generation evolved node B (ng-eNB) in the NR communication system, a next generation node B (gNB) in the NR communication system, a master node (MN) in the dual-connectivity architecture, a second node or a secondary node (SN) in the dual-connectivity architecture, and the like, which is not limited.

Further, the network device may be other devices in the core network (CN), such as an access and mobility management function (AMF), a user plan function (UPF), and the like. It may also be an access point (AP) in a wireless local area network (WLAN), a relay station, a communication device in a future evolved PLMN network, a communication device in an NTN network, and the like.

Further, the network device may include a device providing a wireless communication function to the terminal, such as a chip system. As an example, the chip system may include a chip, and may also include other separate devices.

Further, the network device may communicate with an Internet protocol (IP) network. For example, the Internet (internet), private IP networks, or other data networks.

It should be noted that in some network deployments, the network device may be an independent node to realize all functions of the above base station, which may include a centralized unit (CU) and a distributed unit (DU), such as gNB-CU and gNB-DU. It may also include an active antenna unit (AAU). The CU can realize some functions of the network device, and the DU can also realize some other functions of the network device. For example, the CU is responsible for processing non-real-time protocols and services, achieving the functions of radio resource control

5

6

(RRC) layer, service data adaptation protocol (SDAP) layer, and packet data convergence protocol (PDCP) layer. The DU is responsible for processing physical layer protocols and real-time services, achieving the functions of radio link control (RLC) layer, medium access control (MAC) layer, and physical (PHY) layer. In addition, the AAU can achieve partial physical layer processing functions, radio frequency processing, and related functions of the active antenna. Because the information of the RRC layer will eventually become the information of the PHY layer or be transformed from the information of the PHY layer, under the network deployment, the higher-layer signaling (such as RRC layer signaling) can be considered as being sent by the DU or jointly sent by the DU and the AAU. It is understood that the network device may include at least one of the CU, the DU, or the AAU. In addition, the CU may be classified into the network device in the radio access network (RAN) or into the network device in the core network, which is not limited.

Further the network device may have mobility characteristics, for example the network device may be a mobile device. Alternatively, the network device can be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. Alternatively, the network device can also be a base station arranged on land, water, and the like.

Further, the network device may provide services to the cell, and the terminals within the cell may communicate with the network device over transmission resources (e.g., spectrum resources). The cell may include a macro cell, a small cell, a metro cell, a micro cell, a pico cell, a femto cell, and the like.

In conjunction with the above description, an exemplary description of the wireless communication system of the embodiments of the disclosure is given below.

Exemplarily, for the wireless communication system of the embodiments of the disclosure, reference is made to FIG. 1. The wireless communication system 10 may include a terminal 110 and a network device 120. The network device 120 may be a device communicating with the terminal 110. Meanwhile, the network device 120 may provide communication coverage for a specific geographical region and may communicate with the terminal 110 located within the coverage region.

Optionally, the wireless communication system 10 may also include multiple network devices and a certain number of terminals may be included within the coverage area of each network device, which is not limited.

Optionally, the wireless communication system 10 may also include other network entities such as a network controller, a mobility management entity, and the like, which is not limited.

Optionally, the communication between the network device and the terminal in the wireless communication system 10 may be wireless communication or wired communication, which is not limited.

Prior to the detailed description of the method for determining the frequency-domain position provided in embodiments of the disclosure, the related contents of the embodiments of the disclosure are described.

1. Sounding Reference Signal (SRS)

SRS is an important reference signal in 5G/NR system, which is widely used in various functions in NR system, such as:

(1) a terminal detection process obtained in channel state information (CSI) of a downlink;

(2) uplink beam management;

(3) positioning function;

(4) cooperating with codebook-based uplink transmission, such as determination of frequency-domain scheduling and rank/precoding matrix indicator (PMI)/modulation coding scheme (MCS);

(5) cooperating with non-codebook-based uplink transmission, such as determination of frequency-domain scheduling and SRS resource indicator (SRI)/MCS.

NR SRS not only introduces the concept of SRS resource, but also introduces the concept of SRS resource set. The network device can configure one or more SRS resource sets to one terminal, and each SRS resource set can be configured with one or more SRS resources.

2. Three Different Transmission Modes Supported by SRS

SRS supports three different transmission modes: periodic, semi-persistent, and aperiodic. The details are as follows.

(1) Periodic SRS and Semi-Persistent SRS

The periodic SRS refers to a periodically transmitted SRS whose period and slot offset are configured by RRC signaling. If the terminal receives the related configuration information configured by the RRC signaling, the terminal transmits the SRS in a certain period based on the related information until the related configuration information fails. In addition, spatial relation information of the periodic SRS is also configured by the RRC signaling. The spatial relation information is used to implicitly indicate the transmission beam, and the spatial relation information may indicate a channel state information-reference signal (CSI-RS), a synchronization signal and PBCH block (SSB), or a reference SRS. Thus, the terminal may determine the transmission beam of the SRS resource based on a reception beam of the CSI-RS/SSB indicated by the spatial relation information, or determine the transmission beam of the SRS resource based on the transmission beam of the reference SRS resource.

The semi-persistent SRS also refers to a periodically transmitted SRS. Its period and slot offset are configured by the RRC signaling, but its activation signaling and deactivation signaling are carried by the medium access control-control element (MAC CE) of the medium access control layer. After receiving the activation signaling, the terminal starts to periodically transmit the SRS until the deactivation signaling is received. Meanwhile, the spatial relation information of the semi-persistent SRS is carried together by the MAC CE activating the SRS.

After the terminal receives the period and slot offset configured by the RRC signaling, the slot that can be used for transmitting the SRS is determined based on the following formula (1).

$$\left(N_{slot}^{frame,\mu} n_f + n_{s,f}^{\mu} - T_{offset}\right) \bmod T_{SRS} = 0 \tag{1}$$

$$N_{slot}^{frame,\mu}$$

denotes the number of slots in each radio frame when the sub-carrier configuration is $\mu$, $n_f$ denotes the system frame number (SFN), $$n_{s,f}^{\mu}$$

denotes the slot index in one radio frame when the sub-carrier configuration is $\mu$, $T_{offset}$ denotes the slot offset configured by the RRC signaling, and $T_{SRS}$ denotes the period configured by the RRC signaling.

(2) Aperiodic SRS

Aperiodic SRS refers to the SRS with aperiodic transmission. The aperiodic SRS is a new concept introduced in NR system. Meanwhile, the network device can trigger, through downlink control information (DCI), the terminal to aperiodically transmit the SRS. In addition, the trigger signaling for triggering the aperiodic SRS transmission can be carried either by DCI for scheduling physical uplink shared channel (PUSCH) or physical downlink shared channel (PDSCH) in UE-specific search space or by DCI format 2_3 in common search space. DCI format 2_3 can be used not only to trigger the aperiodic SRS transmission, but also to configure TPC commands of the SRS on a group of UEs or a group of carriers. Meanwhile, DCI carries a 2-bit SRS-request to trigger the aperiodic SRS transmission.

After receiving the aperiodic SRS trigger signaling (such as DCI), the terminal performs the aperiodic SRS transmission on the SRS resource set indicated by the trigger signaling. The slot offset between the trigger signaling and the aperiodic SRS transmission is configured by the higher-layer signaling (such as RRC signaling). Meanwhile, the network device indicates the configuration parameter of each SRS resource set to the terminal in advance through the higher-layer signaling, including time-frequency resource, sequence parameter, power control parameter, etc. In addition, for each SRS resource in the triggered SRS resource set, the terminal can also determine the transmission beam used for transmitting the SRS on the SRS resource through the spatial relation information of the SRS resource, and the spatial relation information is configured to each SRS resource through RRC information.

3. Bandwidth Configuration of SRS

The bandwidth configuration of the SRS is shown in Table 1. The bandwidth configuration of the SRS can be determined by the higher-layer parameter $C_{SRS}$ and the higher-layer parameter $B_{SRS}$ configured by the higher-layer signaling, $m_{SRS,b}$ denotes the number of physical resource blocks (PRB) in the SRS transmission. $b=B_{SRS}$, $C_{SRS} \in \{0, 1, \ldots, 63\}$ is given by a field c-SRS contained in the higher-layer parameter freqHopping, $B_{SRS} \in \{0, 1, 2, 3\}$ is given by a field b-SRS contained in the higher-layer parameter freqHopping, and $b_{hob} \in \{0, 1, 2, 3\}$ is given by a field b-hop contained in the higher-layer parameter freqHopping.

The 5G NR communication system supports frequency-hopping in the SRS transmission. If $b_{hop} < B_{SRS}$ is satisfied ($b_{hop}$ is the parameter configured by the higher-layer signaling), the SRS frequency-hopping transmission is enabled, and the terminal transmits the SRS in the form of frequency-hopping. If $b_{hop} \geq B_{SRS}$ is satisfied ($b_{hop}$ is the parameter configured by the higher-layer signaling), the SRS frequency-hopping transmission is disabled, and the terminal does not transmit the SRS in the form of frequency-hopping. $m_{SRS,0}$ can represent the total bandwidth of SRS frequency-hopping and $m_{SRS,b}$ can represent the number of PRBs in each frequency-hopping transmission.

If $b_{hop} < B_{SRS}$, SRS frequency-hopping is enabled, and terminal can determine the frequency-domain position of each frequency-hopping based on the following formula (2).

$$n_b = \begin{cases} \lfloor 4n_{RRC}/m_{SRS,b} \rfloor \bmod N_b & b \leq b_{hop} \\ (F_b(n_{SRS}) + \lfloor 4n_{RRC}/m_{SRS,b} \rfloor) \bmod N_b & \text{otherwise} \end{cases} \quad (2)$$

$n_b$ denotes the frequency-domain position determination parameter, $N_b$ is determined by Table 1, $n_{RRC}$ is the parameter configured by the higher-layer signaling, and operator $\lfloor \cdot \rfloor$ denotes rounding-down, $F_b(n_{SRS})$ is determined based on the following formula (3).

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \\ \quad \left\lfloor \frac{n_{SRS} \bmod \prod_{b'=b_{hop}}^{b} N_{b'}}{2\prod_{b'=b_{hop}}^{b-1} N_{b'}} \right\rfloor \quad \text{if } N_b \text{ even} \\ \lfloor N_b/2 \rfloor \lfloor n_{SRS} / \prod_{b'=b_{hop}}^{b-1} N_{b'} \rfloor \quad \text{if } N_b \text{ odd} \end{cases} \quad (3)$$

No matter what the value of $N_b$ is, $$N_{b_{hop}} = 1.$$

$N_{SRS}$ represents the number of SRS frequency-hopping (SRS transmissions). For the aperiodic SRS, the number of SRS frequency-hopping is determined based on the following formula (4).

$$n_{SRS} = \lfloor l'/R \rfloor \quad (4)$$

$$l' \in \{0, 1, \ldots, N_{symb}^{SRS} - 1\}; N_{symb}^{SRS}$$

represents the number of consecutive OFDM symbols (configured by the higher-layer signaling); R is a repetition factor (repetitionFactor), which is configured by the higher-layer signaling and R indicates the number of repetitive OFDM symbols of SRS frequency-hopping. For example, if R=1, frequency-hopping is in the unit of one OFDM symbol; if R=2, frequency-hopping is in the unit of two OFDM symbols.

TABLE 1

| $C_{SRS}$ | $B_{SRS}=0$ | | $B_{SRS}=1$ | | $B_{SRS}=2$ | | $B_{SRS}=3$ | |
| | $M_{SRS,0}$ | $N_0$ | $M_{SRS,1}$ | $N_1$ | $M_{SRS,2}$ | $N_2$ | $M_{SRS,3}$ | $N_3$ |
|---|---|---|---|---|---|---|---|---|
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| ... | ... | ... | ... | ... | ... | ... | ... | ... |

For the periodic SRS or semi-periodic SRS, the number of SRS frequency-hopping is determined based on the following formula (5).

$$n_{SRS} = \left( \frac{N_{slot}^{frame,\mu} n_f + n_{s,f}^{\mu} - T_{offset}}{T_{offset}} \right) \cdot \left( \frac{N_{symb}^{SRS}}{R} \right) + \left\lfloor \frac{l'}{R} \right\rfloor \tag{5}$$

$$N_{slot}^{frame,\mu}$$

represents the number of slots in each radio frame when the sub-carrier configuration is μ, $n_f$ denotes the system frame number (SFN), $$n_{s,f}^{\mu}$$

denotes the slot index in one radio frame when the sub-carrier configuration is μ, $T_{offset}$ denotes the slot offset configured by the RRC signaling, and $T_{SRS}$ denotes the period configured by the RRC signaling.

$$N_{slot}^{frame,\mu}$$

is determined by Table 2.

In Table 2, Δf denotes a sub-carrier spacing, $$N_{symb}^{slot}$$

denotes the number of OFDM symbols included in each slot, $$N_{slot}^{subframe,\mu}$$

denotes the number of slots included in each subframe, and $T_{slot}$ denotes the length of the slot.

TABLE 2

| μ | Δf = $2^\mu \cdot 14$[kHz] | $N_{symb}^{slot}$ | $N_{slot}^{frame,\mu}$ | $N_{slot}^{subframe,\mu}$ | $T_{slot}$[ms] | Cyclic prefix |
|---|---|---|---|---|---|---|
| 0 | 15 | 14 | 10 | 1 | 1 | normal |
| 1 | 30 | 14 | 20 | 2 | 0.5 | normal |
| 2 | 60 | 14 | 40 | 4 | 0.25 | normal |
| 3 | 120 | 14 | 80 | 8 | 0.125 | normal |
| 4 | 240 | 14 | 160 | 16 | 0.0625 | normal |

If $b_{hop} \geq B_{SRS}$, the SRS frequency-hopping function is disabled, and the frequency-domain position determination parameter $n_b$ is calculated based on the following formula (6).

$$n_b = \lfloor 4n_{RRC}/m_{SRS,b} \rfloor \bmod N_b \tag{6}$$

In addition, the frequency-domain starting position of the SRS resource is calculated based on the following formula (7).

$$k_0^{(p_i)} = \overline{k}_0^{(p_i)} + \sum_{b=0}^{B_{SRS}} K_{TC} \cdot M_{sc,b}^{SRS} \cdot n_b \tag{7}$$

$$\overline{k}_0^{(p_i)} = n_{shift} \cdot N_{sc}^{RB} + (k_{TC}^{(p_i)} + k_{offset}^{l'}) \bmod K_{TC}, \text{ and}$$

$$k_{TC}^{(p_i)} = \begin{cases} (\overline{k}_{TC} + K_{TC}/2) \bmod K_{TC}, & \text{if } n_{SRS}^{cs} \in \{n_{SRS}^{cs,max}/2, \ldots, n_{SRS}^{cs,max} - 1\} \\ & \text{and } N_{ap}^{SRS} = 4 \text{ and } p_i \in \{1001, 1003\}. \\ \overline{k}_{TC}, & \text{otherwise} \end{cases}$$

The parameters are described as follows:
$n_{shift}$: SRS frequency-domain offset;

$$N_{sc}^{RB}:$$

12, the number of sub-carriers in one RB;
$K_{TC}$: the comb number;

$$n_{SRS}^{cs,max}:$$

the maximum cyclic shift of SRS;
$p_i$: antenna port number;

$$n_{SRS}^{cs}:$$

cyclic shift of SRS or cyclic shift index of SRS;
$\overline{k}_{TC}$: comb offset, $\overline{k}_{TC} \in \{0, 1, \ldots, K_{TC}-1\}$ In conclusion, to obtain better coverage performance of uplink transmission, for the SRS resources configured by the network, only a part of the SRS resources in the frequency-domain can be selected for transmitting the SRS, which is beneficial to improving the power spectral density (PSD) of the transmit power of the SRS and can further obtain better coverage performance. Thus, such transmission mode can be called the partial sounding transmission. As can be seen, based on the related communication protocol standards, it is necessary to deeply study the frequency-domain resource position of the SRS resource in the partial sounding transmission, to further improve the utilization efficiency and coverage performance of the band resource and enhance the multiplexing capability of the SRS.

Combined with the above description, embodiments of the disclosure provide a schematic flow chart of a method for determining a frequency-domain resource position. Referring to FIG. 2, the method includes the following.

S210, a network device sends configuration information for an SRS resource to a terminal, where the configuration information includes L first configuration parameters and L is an integer greater than or equal to 1.

The first configuration parameter may be used for configuring an SRS partial sounding transmission on the SRS resource of the terminal.

The configuration information may be used for determining a frequency-domain position in the SRS resource for transmitting an SRS.

It should be noted that the network device can configure the SRS resource to the terminal, so that the terminal can transmit the SRS on the configured SRS resource. Meanwhile, in embodiments of the disclosure, the network device can send the configuration information for the SRS resource to the terminal. Then, the terminal determines, based on the configuration information, the resource position in the SRS resource for transmitting the SRS, to transmit the SRS through the frequency-domain position. The configuration information of the embodiments of the disclosure includes the first configuration parameter and the first configuration parameter can be used for configuring the SRS partial sounding transmission on the SRS resource of the terminal. The partial sounding transmission can achieve the following benefits: improving the power spectral density of the transmit power (PSD) of the SRS, that is, the partial sounding transmission can obtain additional power gain; obtaining better coverage performance; improving the multiplexing capability of the SRS, that is, band resources not for transmitting the SRS can be configured to other terminals; and the like.

The sounding reference signal resource will be described in detail in the following embodiments of the disclosure.

Specifically, the sounding reference signal resource (SRS resource) in embodiments of the disclosure is one of at least one SRS resource in the SRS resource set. Meanwhile, the SRS resource set is configured by the network device through the higher-layer signaling.

It should be noted that the higher-layer signaling occurred in embodiments of the disclosure may be RRC signaling or MAC CE signaling. In addition, the network device can configure at least one SRS resource set to the terminal through the higher-layer signaling, and each SRS resource set includes at least one SRS resource.

Further, the SRS set is configured by the higher-layer parameter SRS-ResourceSet, and the SRS resource is configured by the higher-layer parameter SRS-Resource.

Further, the higher-layer parameter SRS-ResourceSet contains the parameter usage, and usage can be configured as one of the set: {beamManagement, codebook, nonCodebook, antennaSwitching}.

S220, the terminal obtains from the network device the configuration information for the SRS resource.

The configuration information will be described in detail in the following embodiments of the disclosure.

In one possible example, the configuration information further includes a frequency-hopping parameter, and the frequency-hopping parameter is used for configuring enablement or disablement of an SRS frequency-hopping transmission of the terminal on the SRS resource.

It should be noted that the information element (IE) in the higher-layer signaling includes the SRS-Config information element, and the SRS-Config information element is used for configuring the transmission of the SRS. Meanwhile, the SRS-Config information element contains the higher-layer parameter SRS-ResourceSet, the higher-layer parameter SRS-Resource, and the like. The higher-layer parameter SRS-Resource includes the frequency-hopping parameter (freqHopping), and freqHopping includes the following three fields: c-SRS ($C_{SRS}$), b-SRS ($B_{SRS}$), and b-hop ($b_{hop}$). c-SRS can be configured as one of the values in the set $(0, \ldots, 63)$; b-SRS can be configured as one of the values in the set $(0, \ldots, 3)$, and b-hop can be configured as one of the values in the set $(0, \ldots, 3)$. Therefore, if $b_{hop} \geq B_{SRS}$, the SRS frequency-hopping transmission on the SRS resource is disabled; if $b_{hop} \leq B_{SRS}$, the SRS frequency-hopping transmission on the SRS resource is enabled.

In a possible example, the SRS resource includes M SRS symbols, and M is an integer. The first configuration parameter is used for configuring n resource blocks (RBs) on each of the M SRS symbols which are used for transmitting the SRS, where n=m/p, m is greater than n, m depends on the frequency-hopping parameter, and p depends on the first configuration parameter. The n RBs are consecutive or nonconsecutive in a frequency-domain.

It should be noted that, firstly, the SRS symbol occurred in embodiments of the disclosure can be understood as the symbol carrying the SRS, and the symbol may be an OFDM symbol, a CP-OFDM symbol, a DFT-s-OFDM symbol, or other types of symbols, which is not limited.

Secondly, the network device can configure M $$\left( N_{symb}^{SRS} \right)$$

SRS symbols in the SRS resource through the higher-layer signaling. The value of M can be one of {1, 2, 4, 6, 8, 10, 12, 14}. For example, the field contained in the resource mapping parameter (resourceMapping) in the higher-layer parameter SRS-Resource: the number of consecutive symbols (nrofSymbols). nrofSymbols can configure M.

Finally, the network device may also configure a first configuration parameter (i.e., $P_F$ parameter) through the higher-layer signaling, for configuring n (m/p) RBs on each of the M SRS symbols for transmitting the SRS. That is, the $P_F$ parameter can indicate that there are only $$\frac{1}{P_F} m_{SRS,b}$$

consecutive RBs on one SRS symbol for transmitting the SRS, and the value of $P_F$ can be one of {2, 3, 4, 8}, and such transmission mode can also be called the SRS partial sounding transmission. In the embodiments of the disclosure, $m_{SRS,b}$ is represented with the parameter m, $$\frac{1}{P_F} m_{SRS,b}$$

is represented with the parameter n, and $P_F$ is represented with the parameter p, that is, p depends on the first configuration parameter. In addition, as can be seen from the above Table 1, $m_{SRS,b}$ can be determined by the higher-layer parameter $C_{SRS}$ and $B_{SRS}$, that is, m depends on the frequency-hopping parameter.

In a possible example, if the SRS frequency-hopping transmission on the SRS resource is enabled and the configuration information further includes a repetition-factor parameter, the SRS resource includes K groups of SRS frequency-hopping transmissions, and K depends on the repetition-factor parameter and M.

Specifically, at least one group of the K groups of SRS frequency-hopping transmissions includes R SRS symbols, and R depends on the repetition-factor parameter. The R SRS symbols are consecutive or nonconsecutive in a time-domain.

It should be noted that, firstly, the network device can configure the repetition-factor parameter (repetition Factor) to the terminal through the higher-layer signaling. For example, the field contained in the resource mapping parameter (resourceMapping) in the higher-layer parameter SRS-Resource: repetitionFactor. repetitionFactor can configure R, which can be one of {1, 2, 4}.

Secondly, the repetition-factor parameter can indicate that a group of R (R depends on the repetition-factor parameter)

SRS symbols corresponds to the same frequency-domain position, or in the SRS resource, frequency-hopping in the frequency-domain has a granularity of R symbols.

Finally, in embodiments of the disclosure, each group of frequency-hopping transmissions is called a first group of frequency-hopping transmissions, a second group of frequency-hopping transmissions, a K-th group of frequency-hopping transmissions, etc. in the SRS resource. Each group of frequency-hopping transmissions can contain R SRS symbols. In addition, K may denote an index, and its maximum value depends on a result obtained by: dividing the total number (M) of SRS symbols in the SRS resource by R to obtain a quotient and then rounding up the quotient.

In a possible example, each of the K groups of SRS frequency-hopping transmissions corresponds to a same first configuration parameter among the L first configuration parameters; or each of the K groups of SRS frequency-hopping transmissions corresponds to a different first configuration parameter among the L first configuration parameters.

It should be noted that the network device can only configure one same $P_F$ parameter for each group of SRS frequency-hopping transmissions in one SRS resource through the higher-layer signaling. That is, one $P_F$ parameter is applicable to each group of SRS frequency-hopping in the SRS resource.

In addition, the network device can configure one $P_F$ parameter for each group of SRS frequency-hopping transmissions in one SRS resource through the higher-layer signaling, respectively. $P_F$ parameters corresponding to different groups of SRS frequency-hopping transmissions can be different.

In a possible example, each SRS symbol in the SRS resource corresponds to a same first configuration parameter among the L first configuration parameters, or each SRS symbol in the SRS resource corresponds to a different first configuration parameter among the L first configuration parameters.

It should be noted that, firstly, the network side can configure one $P_F$ parameter for one SRS resource set through the higher-layer signaling. That is, one $P_F$ parameter is applicable to each SRS symbol in each SRS resource in the SRS resource set. That is, for each SRS symbol, n consecutive RBs are transmitted.

Secondly, the network device can configure one $P_F$ parameter for one SRS resource through the higher-layer signaling. Therefore, each SRS symbol in the SRS resource corresponds to the same $P_F$ parameter, i.e., one $P_F$ parameter is applicable to each SRS symbol in the SRS resource. As can be seen, for each SRS symbol in the SRS resource, n consecutive RBs may be transmitted.

Finally, the network device can configure one $P_F$ parameter for each SRS symbol in one SRS resource through the higher-layer signaling, respectively. $P_F$ parameters corresponding to different SRS symbols can be different.

In one possible example, the SRS partial sounding transmission on the SRS resource and the enablement of the SRS frequency-hopping transmission do not co-exist, or both the SRS partial sounding transmission on the SRS resource and the enablement of the SRS frequency-hopping transmission exist.

It should be noted that when the network device has configured the $P_F$ parameter and the parameter $b_{hop}$, it is necessary to ensure that the configured parameter $b_{hop}$ meet $b_{hop} \geq B_{SRS}$, that is, the SRS frequency-hopping transmission is disabled. That is, the SRS partial sounding transmission on the SRS resource does not co-exist with the enablement of the SRS frequency-hopping transmission.

Alternatively, when the network device has configured the $P_F$ parameter and the configured parameter $b_{hop}$ meets $b_{hop} < B_{SRS}$, the terminal considers that the SRS frequency-hopping transmission is still in a disabled state. That is, the SRS partial sounding transmission on the SRS resource does not co-exist with the enablement of the SRS frequency-hopping transmission.

Alternatively, when the network device has configured the $P_F$ parameter and the configured parameter $b_{hop}$ meets $b_{hop} < B_{SRS}$, the terminal will only perform the SRS frequency-hopping operation, and will not perform the partial sounding transmission. That is, the terminal ignores the $P_F$ parameter. That is, the SRS partial sounding transmission on the SRS resource co-exists with the enablement of the SRS frequency-hopping transmission.

Alternatively, if the parameter $b_{hop}$ configured by the network device meets $b_{hop} < B_{SRS}$, the network device will not configure the $P_F$ parameter at the same time.

Alternatively, when the network device has configured the $P_F$ parameter and the configured parameter $b_{hop}$ meets $b_{hop} < B_{SRS}$, the terminal may simultaneously perform the SRS frequency-hopping transmission and the SRS partial sounding transmission. That is, the SRS partial sounding transmission on the SRS resource co-exists with the enablement of the SRS frequency-hopping transmission.

S230, the terminal determines, based on the configuration information including the first configuration parameter, the frequency-domain position in the SRS resource for transmitting the SRS.

In a possible example, determining, based on the configuration information, the frequency-domain position in the SRS resource for transmitting the SRS includes: determining, by the terminal based on the configuration information, frequency-domain positions of the n RBs on each SRS symbol for transmitting the SRS, where each SRS symbol includes: each SRS symbol of the M SRS symbols in the SRS resource or each SRS symbol in each group of SRS frequency-hopping transmissions in the SRS resource.

It can be understood that, in the case that the network device configures one $P_F$ parameter for one SRS resource, $$n\left(\frac{1}{P_F}m_{SRS,b}\right)$$

RBs for transmitting the SRS may exist on each of the M SRS symbols in the SRS resource of the embodiments of the disclosure, or n RBs for transmitting the SRS may exist on each SRS symbol in each group of SRS frequency-hopping transmissions in the SRS resource. Therefore, the terminal of the embodiments of the disclosure can determine the frequency-domain positions of the n RBs on each SRS symbol based on the configuration information.

How the terminal determines the frequency-domain position in the SRS resource for transmitting the SRS based on the configuration information is described in detail in the following manners.

Manner 1

In a possible example, determining the frequency-domain positions of the n RBs on each SRS symbol based on the configuration information may include: determining, by the terminal, frequency-domain position information of m RBs based on the configuration information, where the frequency-domain position information indicates indexes of the m RBs; and determining, by the terminal, the frequency-domain positions of the n RBs on each SRS symbol based on the frequency-domain position information.

It should be noted that, since the configuration information may include parameters such as the frequency-hopping parameter, the repetition-factor parameter, the antenna port index of the SRS resource, the comb number, etc., the terminal can first determine, based on the configuration information, the index of each of m ($m_{SRS,b}$) RBs in the non-partial sounding transmission. That is, based on Table 1 as well as the index of each of the m RBs, the frequency-domain positions of the n RBs on each of the M SRS symbols or each SRS symbol in each group of SRS frequency-hopping transmissions is determined.

Specifically, the frequency-domain positions of the n RBs on each SRS symbol are obtained by: for each of the M SRS symbols, starting with a first SRS symbol, sorting the n RBs on each SRS symbol sequentially in an increasing order or a decreasing order of the indexes of the m RBs, where n RBs on the first SRS symbol of the M SRS symbols correspond to n RBs with the lowest or highest index among the m RBs, and n RBs on a second SRS symbol of the M SRS symbols correspond to n RBs with the lowest or highest index other than the n RBs with the lowest or highest index among the m RBs.

Specifically, the frequency-domain positions of the n RBs on each SRS symbol are obtained by: for each SRS symbol in each group of SRS frequency-hopping transmissions in the SRS resource, starting with a first SRS symbol, sorting the n RBs on each SRS symbol sequentially in an increasing order or a decreasing order of the indexes of the m RBs, where n RBs on the first SRS symbol in each group of SRS frequency-hopping transmissions correspond to n RBs with the lowest or highest index among the m RBs, and n RBs on a second SRS symbol in each group of SRS frequency-hopping transmissions correspond to n RBs with the lowest or highest index other than the n RBs with the lowest or highest index among the m RBs.

It should be noted that when the network device configures one $P_F$ parameter for one SRS resource, n RBs for transmitting the SRS exist on each SRS symbol (each SRS symbol of the M SRS symbols or each SRS symbol in each group of frequency-hopping transmissions) in the SRS resource. Then, the terminal obtains the frequency-domain position information of the m RBs corresponding to the SRS transmission through the configuration information. Finally, the frequency-domain positions of the n RBs on each SRS symbol in the SRS resource determined by the terminal based on the configuration information meet the following requirements.

Firstly, n RBs on the first (i.e., 1st) SRS symbol of the M SRS symbols (or in each group of frequency-hopping transmissions) correspond to n RBs with the lowest (or highest) index among the m RBs. Secondly, n RBs on the second (i.e., 2nd) SRS symbol correspond to n RBs with the lowest (or highest) index, except the n RBs occupied by the transmission on the first SRS symbol, among the m RBs. Again, n RBs on the third (i.e., 3rd) SRS symbol correspond to n RBs with the lowest (or highest) index, except the 2*n RBs occupied by the transmission on the first SRS symbol and the second SRS symbol, among the m RBs, and so on. Finally, if the number of remaining optional RBs on a certain SRS symbol is less than n, the remaining RBs are used for the SRS transmission.

Example 1: reference is made to FIG. 3. First, the network device configures one SRS resource to the terminal, and the SRS resource includes 8 SRS symbols. Secondly, the net-work device sends the configuration information to the terminal, where the configuration information includes parameters such as $C_{SRS}$, $B_{SRS}$, $b_{hop}$, $P_F$, and the value of $P_F$ is 4. Therefore, based on the configuration information, the terminal determines that there are 8 consecutive RBs (such as RBs denoted by slash-grid blocks) for transmitting the SRS on each SRS symbol in the non-partial sounding transmission, and the indexes of the 8 RBs are RB-3 to RB-10, respectively. Meanwhile, the SRS frequency-hopping transmission on the SRS resource is enabled, so the SRS resource includes two groups of SRS frequency-hopping transmissions. The first group of SRS frequency-hopping transmissions includes 4 SRS symbols, and the second group of SRS frequency-hopping transmissions includes 4 SRS symbols. Since the network device has configured the $P_F$ parameter, there are 2 (8/4) RBs (such as RBs denoted by gray blocks) for transmitting the SRS on each SRS symbol in each group of SRS frequency-hopping transmissions in the partial sounding transmission. Finally, the frequency-domain positions of two RBs on the first SRS symbol in the first group of SRS frequency-hopping transmissions correspond to two RBs with indexes of RB-3 and RB-4 among the 8 RBs, the frequency-domain positions of two RBs on the second SRS symbol in the first group of SRS frequency-hopping transmissions correspond to two RBs with indexes of RB-5 and RB-6 among the 8 RBs, and so on.

Manner 2

In one possible example, the configuration information further includes a first frequency-domain offset, where the first frequency-domain offset represents an offset in a frequency-domain of a frequency-domain starting position of n RBs on a first SRS symbol of the M SRS symbols with a preset reference point or represents an offset in the frequency-domain of a frequency-domain starting position of n RBs on a first SRS symbol in each group of SRS frequency-hopping transmissions with the preset reference point.

The unit of the first frequency-domain offset is RB or resource element (RE).

The first frequency-domain offset is configured by the higher-layer signaling.

The first frequency-domain offset and the $P_F$ parameter are in one-to-one correspondence.

Specifically, the preset reference point is one of: a reference point PointA, one RB with the lowest index among m RBs, a sub-carrier with an index of 0 in one RB with the lowest index among the m RBs, one RB with the lowest index in a bandwidth part (BWP) in which the SRS resource is located, a sub-carrier with an index of 0 in one RB with the lowest index in the BWP in which the SRS resource is located, a common resource block (CRB) with an index of 0, a sub-carrier with an index of 0 in the CRB with the index of 0, or a RB with the lowest index or a sub-carrier with an index of 0 in the RB with the lowest index in SRS frequency-domain resource positions obtained in an SRS non-partial sounding transmission.

It should be noted that, when the terminal performs the SRS partial sounding transmission, the frequency-domain starting position of the n RBs used for transmitting the SRS on one SRS symbol can be determined by Table 1 and parameters such as antenna port index of SRS resource, comb number, and frequency-domain offset. The frequency-domain offset can take PointA as the reference point. PointA is a reference point, which, in one case, is calculated based on OffsetToPointA, subCarrierSpacingCommon, and the SSB position obtained in cell search, and in the other case, is configured directly. OffsetToPointA and subCarrierSpacingCommon can be configured by the higher-layer.

In one possible example, the configuration information further includes a second frequency-domain offset, where the second frequency-domain offset represents an offset between a frequency-domain starting position of n RBs on each of two adjacent SRS symbols of the M SRS symbols or represents an offset between a frequency-domain starting position of n RBs on each of two adjacent SRS symbols in each group of SRS frequency-hopping transmissions.

The second frequency-domain offset may be a positive offset or a negative offset.

It will be appreciated that, in embodiments of the disclosure, the offset between the frequency-domain starting position of the n RBs on each of two adjacent SRS symbols in the M SRS symbols (or each group of SRS frequency-hopping transmissions) may be determined based on the second frequency-domain offset.

In a possible example, determining the frequency-domain positions of the n RBs on each SRS symbol based on the configuration information may include: determining, by the terminal, the frequency-domain starting position of the n RBs on the first SRS symbol of the M SRS symbols based on the configuration information and the first frequency-domain offset, to obtain a first frequency-domain starting position; and determining, by the terminal, a frequency-domain starting position of n RBs on each remaining SRS symbol other than the first SRS symbol of the M SRS symbols based on the first frequency-domain starting position and the second frequency-domain offset.

In a possible example, determining the frequency-domain positions of the n RBs on each SRS symbol based on the configuration information may include: determining, by the terminal, the frequency-domain starting position of the n RBs on the first SRS symbol in each group of SRS frequency-hopping transmissions based on the configuration information and the first frequency-domain offset, to obtain a second frequency-domain starting position; and determining, by the terminal, a frequency-domain starting position of n RBs on each remaining SRS symbol other than the first SRS symbol in each group of SRS frequency-hopping transmissions based on the second frequency-domain starting position and the second frequency-domain offset.

The first frequency-domain starting position and the second frequency-domain starting position are described in detail below.

It should be noted that when the network device has configured one $P_F$ parameter for the SRS resource, the terminal performs the SRS partial sounding transmission. Thus, for the frequency-domain starting position (i.e., the first frequency-domain starting position or the second frequency-domain starting position) of the n RBs on the first SRS symbol of the SRS resource (or in each group of SRS frequency-hopping transmissions), a frequency-domain offset operation based on one frequency-domain offset (i.e., the first frequency-domain offset) is required.

Further, when the network device has configured one $P_F$ parameter for the SRS resource, the terminal performs the SRS partial sounding transmission. Thus, for the frequency-domain starting position (i.e., the first frequency-domain starting position or the second frequency-domain starting position) of the n RBs on the first SRS symbol of the SRS resource (or in each group of SRS frequency-hopping transmissions), in addition to adopting the higher-layer parameter $C_{SRS}$, the higher-layer parameter $B_{SRS}$, the higher-layer parameter n RRC, the higher-layer parameter $b_{hop}$, the port index of the SRS resource, the offset relative to the sub-carrier with the index of 0 in the RB in the CRB with the index of 0 configured by the higher-layer, the comb number of the SRS, and Table 1, one frequency-domain offset (i.e., the first frequency-domain offset) may be additionally configured by the higher-layer signaling, for the frequency-domain offset operation. The preset reference point of the first frequency-domain offset can be one of the following: PointA, the CRB with the index of 0, the sub-carrier with the index of 0 in the CRB with the index of 0, one RB with the lowest index in the BWP in which the SRS resource is located, the sub-carrier with the index of 0 in one RB with the lowest index in the BWP in which the SRS resource is located, one RB with the lowest index in the component carrier in which the SRS resource is located, and the sub-carrier with the index of 0 in one RB with the lowest index in the component carrier in which SRS resource is located.

Alternatively, when the network device configures one $P_F$ parameter for the SRS resource, the terminal performs the SRS partial sounding transmission. Therefore, for the frequency-domain starting position (i.e., the first frequency-domain starting position or the second frequency-domain starting position) of the n RBs on the first SRS symbol of the SRS resource (or in each group of SRS frequency-hopping transmissions), the frequency-domain starting position of the SRS resource calculated based on the above formula (7) is taken as the reference point, and one frequency-domain offset (i.e., the first frequency-domain offset) can be additionally configured by the higher-layer signaling, for frequency-domain offset. The preset reference point of the first frequency-domain offset may be the frequency-domain starting position of the SRS resource obtained based on the above formula (7). For example, the terminal obtains based on the above formula (7) that the frequency-domain starting position of the SRS resource is RB-5, and the frequency-domain resource of the SRS resource has 8 consecutive RBs in total. Therefore, the total frequency-domain resource occupied by the SRS resource is RB-5, RB-6, RB-7, RB-8, RB-9, RB-10, RB-11, and RB-12. Meanwhile, $P_F$ is configured to 2 (i.e., p is 2), which means that there are only 4 consecutive RBs on one SRS symbol for transmitting the SRS. In this case, RB-5 is the preset reference point for the first frequency-domain offset. If the first frequency-domain offset is 2, it means that the frequency-domain starting position of 4 consecutive RBs on the first SRS symbol is RB-7, and then the SRS is transmitted on RB-8, RB-9, and RB-10 sequentially.

Alternatively, when the network device configures one $P_F$ parameter for the SRS resource, the terminal performs the SRS partial sounding transmission. Thus, for the frequency-domain starting position (i.e., the first frequency-domain starting position or the second frequency-domain starting position) of the n RBs on the first SRS symbol of the SRS resource (or in each group of SRS frequency-hopping transmissions), in addition to adopting the higher-layer parameter $C_{SRS}$, the higher-layer parameter $B_{SRS}$, the higher-layer parameter $n_{RRC}$, the higher-layer parameter $b_{hop}$, the port index of the SRS resource, the offset relative to the sub-carrier with the index of 0 in the RB in the CRB with the index of 0 configured by the higher-layer, the comb number of the SRS, and Table 1, one frequency-domain offset (i.e., the first frequency-domain offset) may be additionally configured by the higher-layer signaling, for the frequency-domain offset operation. The preset reference point of the first frequency-domain offset can be one RB with the lowest index or a sub-carrier with an index of 0 in one RB with the lowest index in the SRS frequency-domain resource positions obtained in the SRS non-partial sounding transmission. For example, if the SRS frequency-domain resource positions obtained by the terminal in the non-partial sounding transmission are RB-5, RB-6, RB-7, RB-8, RB-9, RB-10, RB-11, and RB-12, and the $P_F$ is configured to be 2 (i.e., p is 2), it means that there are only 4 consecutive RBs on one SRS symbol for the SRS transmission. In this case, the preset reference point of the first frequency-domain offset may be the RB with the smallest index among the SRS frequency-domain resource positions obtained in the non-partial sounding transmission, i.e., RB-5. If the first frequency-domain offset is 2, it means that the frequency-domain starting position of 4 consecutive RBs on the first SRS symbol in the SRS partial sounding transmission is RB-7, and then the SRS is transmitted on RB-8, RB-9, and RB-10 sequentially.

How the terminal determines the frequency-domain starting position of n RBs on each remaining SRS symbol except the first SRS symbol of the M SRS symbols based on the first frequency-domain starting position and the second frequency-domain offset or how the terminal determines the frequency-domain starting position of n RBs on each remaining SRS symbol except the first SRS symbol in each group of SRS frequency-hopping transmissions based on the second frequency-domain starting position and the second frequency-domain offset is described in detail below.

It should be noted that the network device can configure one $P_F$ parameter for one SRS resource, indicating that there are n RBs for transmitting the SRS on each SRS symbol in the SRS resource. Meanwhile, the network device also configures one frequency-domain offset (i.e., the second frequency-domain offset) to represent the offset between the frequency-domain starting position of n RBs on each of two adjacent SRS symbols of the M SRS symbols (or in each group of SRS frequency-hopping transmissions) in the RS resource.

For example, if the second frequency offset is y, and the frequency-domain starting position of n RBs on the first SRS symbol in one SRS resource (or each group of SRS frequency-hopping transmissions in the SRS resource) is known to be the x1-th RB (determined by the configuration information and the first frequency-domain offset), then the frequency-domain starting position of n RBs on the second SRS symbol is the x2-th RB $$(x2 = \mathrm{rem}(x1 + y, N)),$$

the frequency-domain starting position of n RBs on the third SRS symbol is the (rem (x1+2y, N))-th RB or the $$(\mathrm{rem}(x2 + y, N)) - th$$

RB, and so on. r=rem (a, b) denotes the remainder of a divided by b, and N denotes the total number of RBs in the BWP in which the SRS resource is located.

For another example, if the second frequency offset is y, and the frequency-domain starting position of n RBs on the first SRS symbol in one SRS resource (or each group of SRS frequency-hopping transmissions in the SRS resource) is known to be the x1-th RB, then the frequency-domain starting position of n RBs on the SRS on the second SRS symbol is x2-th RB $$(x2 = \mathrm{rem}(\mathrm{abs}(x1 - y), N)),$$

the frequency-domain starting position of n RBs on the third symbol is $$(\mathrm{rem}(\mathrm{abs}(x1 - 2y), N)) - th$$

RB or (rem (abs (x2−y), N))-th RB, and so on. r=rem (a, b) denotes the remainder of a divided by b, abs (c) denotes the absolute value of c, and N denotes the total number of RBs in the BWP in which the SRS resource is located.
Manner 3

In a possible example, determining the frequency-domain positions of the n RBs on each SRS symbol based on the configuration information may include: determining, by the terminal, that the frequency-domain positions of the n RBs on each of the M SRS symbols are consistent with frequency-domain positions of n RBs on a first reference SRS symbol based on the configuration information, where the first reference SRS symbol is one SRS symbol of the M SRS symbols; or determining, by the terminal, that the frequency-domain positions of the n RBs on each SRS symbol in each group of SRS frequency-hopping transmissions are consistent with frequency-domain positions of n RBs on a second reference SRS symbol based on the configuration information, where the second reference SRS symbol is one SRS symbol in each group of SRS frequency-hopping transmissions.

Specifically, the first reference SRS symbol is a first SRS symbol of the M SRS symbols; or the second reference SRS symbol is a first SRS symbol in each group of SRS frequency-hopping transmissions.

It should be noted that when the network device has configured the $P_F$ parameter and the SRS frequency-hopping is also enabled, the n RBs on each SRS symbol in the SRS resource (or each group of SRS frequency-hopping transmissions) of the embodiments of the disclosure occupy the same frequency-domain positions. Meanwhile, the frequency-domain positions of n RBs on a specific SRS symbol from each SRS symbol in the SRS resource (or each group of SRS frequency-hopping transmissions) is selected as a reference. Thus, the frequency-domain positions of the n RBs on each of other SRS symbols in the SRS resource (or each group of SRS frequency-hopping transmissions) are consistent with the frequency-domain positions of the n RBs on the specific SRS symbol. The specific SRS symbol may be the first SRS symbol in the SRS resource (or each group of SRS frequency-hopping transmissions).

Figure 4:
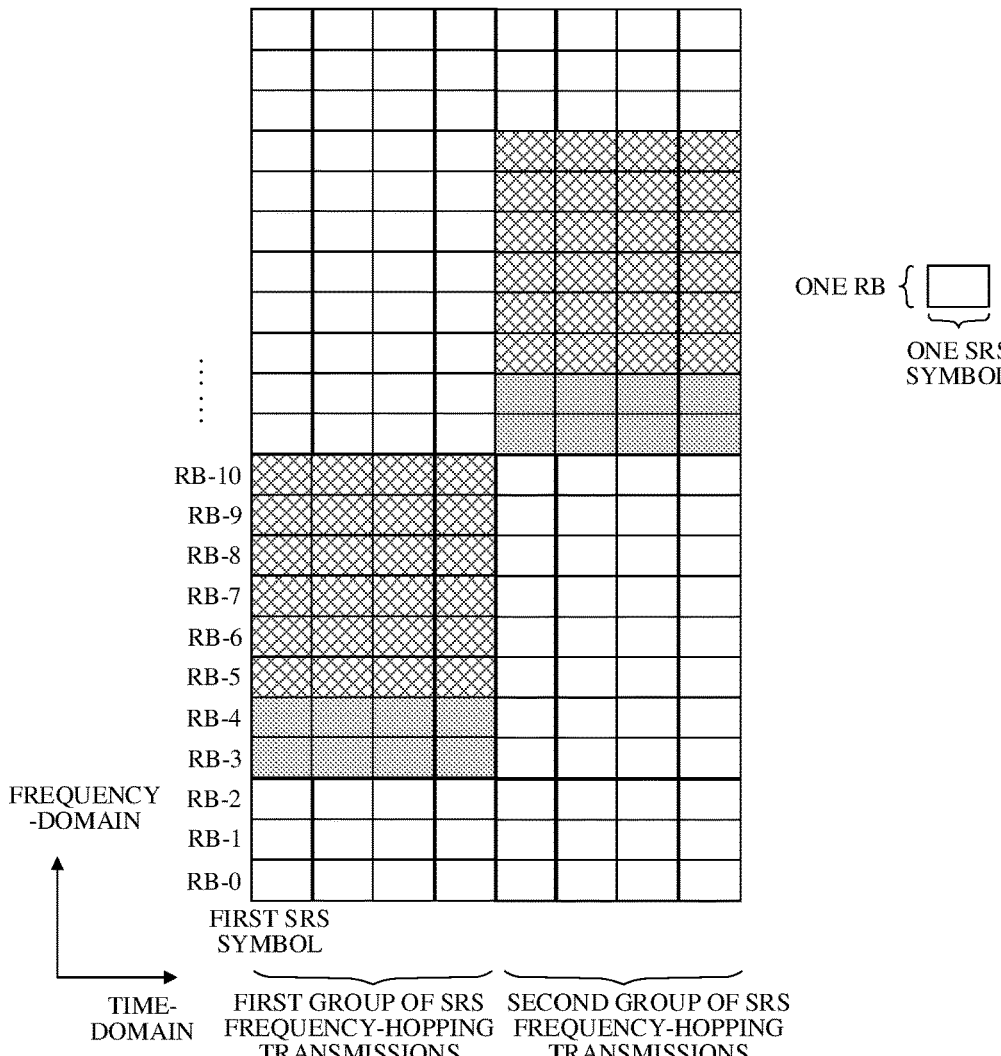
FIG. 4 is another schematic structural diagram of frequency-domain positions of multiple RBs on each SRS symbol in each group of SRS frequency-hopping transmissions provided in embodiments of the disclosure.

Example 2: reference is made to FIG. 4. First, the network device configures one SRS resource to the terminal, where the SRS resource includes 8 SRS symbols. Secondly, the network device sends the configuration information to the terminal, where the configuration information includes parameters such as $C_{SRS}$, $B_{SRS}$, $b_{hop}$, $P_F$, and the value of $P_F$ is 4. Therefore, based on the configuration information, the terminal determines that there are 8 consecutive RBs (such as blocks denoted by slash-grid) for transmitting the SRS on each SRS symbol in the non-partial sounding transmission, and the indexes of the 8 RBs are RB-3 to RB-10, respectively. Meanwhile, the SRS frequency-hopping transmission on the SRS resource is enabled, so the SRS resource includes two groups of SRS frequency-hopping transmissions. The first group of SRS frequency-hopping transmissions includes 4 SRS symbols, and the second group of SRS frequency-hopping transmissions includes 4 SRS symbols. Since the network device has configured the $P_F$ parameter, there are 2 (8/4) RBs (such as RBs denoted by gray blocks)

for transmitting the SRS on each SRS symbol in each group of SRS frequency-hopping transmissions in the partial sounding transmission. Finally, if the first SRS symbol in the first group of SRS frequency-hopping transmissions is used as the reference SRS symbol (i.e., the second reference SRS symbol), the frequency-domain positions of the two RBs on each SRS symbol in the first group of SRS frequency-hopping transmissions are consistent with the frequency-domain positions of the two RBs on the first SRS symbol.

Manner 4

In one possible example, the configuration information includes one group of frequency-domain offsets, where each frequency-domain offset in the group of frequency-domain offsets represents an offset between a frequency-domain starting position of n RBs on each of two adjacent SRS symbols of the M SRS symbols or an offset between a frequency-domain starting position of n RBs on each of two adjacent SRS symbols in each group of SRS frequency-hopping transmissions.

It should be noted that the network device can configure one $P_F$ parameter for one SRS resource, indicating that there are n RBs for transmitting the SRS on each SRS symbol in the SRS resource (each group of SRS frequency-hopping transmissions). Meanwhile, the network device also configures one group of frequency-domain offsets (which can be in the unit of RB or RE) represent the offset in the SRS frequency-domain resource between two adjacent SRS symbols or represent the offset between the frequency-domain starting positions of n RBs on a current SRS symbol (except the first SRS symbol) and the frequency-domain starting positions of n RBs on the first SRS symbol.

For example, if one SRS resource contains 4 SRS symbols, one group of frequency-domain offsets may contain three parameters a1, a2, and a3. a1 represents a frequency-domain offset (either a positive offset or a negative offset) of the frequency-domain starting positions of n RBs on the second SRS symbol in the SRS resource relative to the frequency-domain starting positions of n RBs on the first SRS symbol. a2 represents a frequency-domain offset (either a positive offset or a negative offset) of the frequency-domain starting positions of n RBs on the third SRS symbol in the SRS resource relative to the frequency-domain starting positions of n RBs on the second SRS symbol or the first SRS symbol. a3 represents a frequency-domain offset (either a positive offset or a negative offset) of the frequency-domain starting positions of n RBs on the fourth SRS symbol in the SRS resource relative to the frequency-domain starting positions of n RBs on the third SRS symbol or the first SRS symbol.

Manner 5

In a possible example, the network device may configure one $P_F$ parameter for one SRS resource, indicating that there are n RBs for transmitting the SRS on each SRS symbol in the SRS resource (each group of SRS frequency-hopping transmissions). Meanwhile, a coefficient related to the total number of RBs contained in the BWP in which the SRS is located, such as floor (N/4) or other values related to N, is predefined, where N represents the total number of RBs contained in the BWP in which the SRS is located. floor (a) means rounding down a. Then, the frequency-domain offset (positive offset or negative offset) of the frequency-domain starting position of n RBs on the i-th SRS symbol in the SRS resource relative to the frequency-domain starting position of the n RBs on the (i-1)-th or 1st SRS symbol is the coefficient. The unit of the coefficient can be RB.

As can be seen, in the embodiments of the disclosure, the network device sends the configuration information for the SRS resource to the terminal, where the configuration information includes the L first configuration parameters, and then the terminal determines based on the configuration information the frequency-domain position in the SRS resource for transmitting the SRS. Since the configuration information is sent to the terminal by the network device and the first configuration parameter is used for configuring the SRS partial sounding transmission on the SRS resource of the terminal, the network device can configure the frequency-domain position for transmitting the SRS in the partial sounding transmission. In addition, the terminal determines based on the configuration information the frequency-domain position in the SRS resource for transmitting the SRS. Because the terminal only needs to perform the SRS partial sounding transmission on the SRS resource, it is beneficial to improving the power spectral density of the transmit power of the SRS, the utilization efficiency and coverage performance of the band resource, and the multiplexing capability of the SRS.

The solutions of the embodiments of the disclosure are mainly introduced from the perspective of the method side. It can be understood that the terminal or network device includes a corresponding hardware structure and/or software module for performing each function, to realize the above functions. Those skilled in the art will readily appreciate that the disclosure can be implemented in hardware or a combination of hardware and computer software in conjunction with the various example elements and algorithm steps described in the embodiments disclosed herein. Whether a certain function is executed in the way of hardware or computer software driving hardware depends on the specific application and design constraints of the technical solutions. Those skilled in the art may implement the described functionality using different methods for each specific application but such implementation should not be considered outside the scope of the disclosure.

In embodiments of the disclosure, functional units of terminals or network devices can be divided based on the above method examples. For example, each function unit may be divided based on each function, and two or more functions may be integrated into one processing unit. The integrated unit can be realized either in the form of hardware or in the form of software program module. It should be noted that the division of the units in embodiments of the disclosure is schematic and is only a logical function division, and there can be another division mode in actual implementation.

Figure 5:
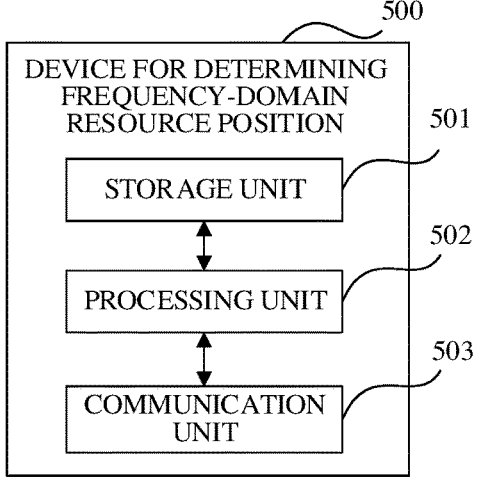
FIG. 5 is a block diagram of functional units of a device for determining a frequency-domain resource position provided in embodiments of the disclosure.

In the case of employing the integrated unit, FIG. 5 a block diagram of functional units of a device for determining a frequency-domain resource position provided in embodiments of the disclosure. The device 500 for determining the frequency-domain resource position includes a processing unit 502 and a communication unit 503. The processing unit 502 is used to control and manage the operation of the terminal. For example, the processing unit 502 is used to support the terminal to perform the steps in FIG. 2 and other procedures for the technical solutions described herein. The communication unit 503 is used to support communication between the terminal and other devices in the wireless communication system. The device 500 for determining the frequency-domain resource position may further include a storage unit 501 for storing program codes executed by and data transmitted by the device 500 for determining the frequency-domain resource position.

It should be noted that the device 500 for determining the frequency-domain resource position may be a chip or a chip module.

The processing unit 502 may be a processor or a controller, such as a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. It may implement or execute various exemplary logic blocks, modules, and circuits described in conjunction with the disclosure of the disclosure. The processing unit 502 may also be a combination that implements computing functions such as a combination of one or more microprocessors, a combination of DSP and microprocessors, and the like. The communication unit 503 may be a communication interface, a transceiver, a transceiver circuit, and the like and the memory unit 501 may be a memory. When the processing unit 502 is a processor, the communication unit 503 is a communication interface, and the storage unit 501 is a memory, the device 500 for determining the frequency-domain resource position of the embodiments of the disclosure may be a terminal shown in FIG. 7.

In specific implementation, the processing unit 502 is used to perform any step performed by the terminal in the above method embodiment and when data transmission such as sending is performed, the communication unit 503 can be selectively invoked to complete the corresponding operation. Details are given below.

The processing unit 502 is configured to: obtain, from a network device, configuration information for an SRS resource, where the configuration information includes L first configuration parameters, each first configuration parameter is used for configuring an SRS partial sounding transmission on the SRS resource of a terminal, and L is an integer greater than or equal to 1; and determine, based on the configuration information including the first configuration parameter, a frequency-domain position in the SRS resource for transmitting an SRS.

It should be noted that the specific implementation of each operation in the embodiments described in FIG. 5 can be described in detail in the above method embodiments shown in FIG. 2, and will not be repeated herein.

It can be seen that, in embodiments of the disclosure, the configuration information for the SRS resource is received from the network device, and the configuration information includes the L first configuration parameters and the first configuration parameter is used for configuring the SRS partial sounding transmission on the SRS resource of the terminal. As such, the network device can configure the frequency-domain position for transmitting the SRS in the partial sounding transmission. In addition, the terminal determines based on the configuration information the frequency-domain position in the SRS resource for transmitting the SRS. Because the terminal only needs to perform the SRS partial sounding transmission on the SRS resource, it is beneficial to improving the power spectral density of the transmit power of the SRS, the utilization efficiency and coverage performance of the band resource, and the multiplexing capability of the SRS.

In a possible example, the configuration information further includes a frequency-hopping parameter, and the frequency-hopping parameter is used for configuring enablement or disablement of an SRS frequency-hopping transmission of the device on the SRS resource.

In a possible example, the SRS resource includes M SRS symbols, and M is an integer; the first configuration parameter is used for configuring n RBs on each of the M SRS symbols which are used for transmitting the SRS, where n=m/p, m is greater than n, m is determined by the frequency-hopping parameter, and p is determined by the first configuration parameter; and the n RBs are consecutive or nonconsecutive in a frequency-domain.

In a possible example, when the SRS frequency-hopping transmission on the SRS resource is enabled and the configuration information further includes a repetition-factor parameter, the SRS resource includes K groups of SRS frequency-hopping transmissions, and K depends on the repetition-factor parameter and M.

In a possible example, at least one group of the K groups of SRS frequency-hopping transmissions includes R SRS symbols, and R depends on the repetition-factor parameter; and the R SRS symbols are consecutive or nonconsecutive in a time-domain.

In a possible example, each of the K groups of SRS frequency-hopping transmissions corresponds to a same first configuration parameter among the L first configuration parameters; or each of the K groups of SRS frequency-hopping transmissions corresponds to a different first configuration parameter among the L first configuration parameters.

In a possible example, each SRS symbol in the SRS resource corresponds to a same first configuration parameter among the L first configuration parameters; or each SRS symbol in the SRS resource corresponds to a different first configuration parameter among the L first configuration parameters.

In a possible example, the SRS partial sounding transmission on the SRS resource and the enablement of the SRS frequency-hopping transmission do not co-exist; or both the SRS partial sounding transmission on the SRS resource and the enablement of the SRS frequency-hopping transmission exist.

In a possible example, the processing unit 502 configured to determine, based on the configuration information including the first configuration parameter, the frequency-domain position in the SRS resource for transmitting the SRS is configured to: determine, based on the configuration information, frequency-domain positions of the n RBs on each SRS symbol for transmitting the SRS, where each SRS symbol includes: each SRS symbol of the M SRS symbols in the SRS resource or each SRS symbol in each group of SRS frequency-hopping transmissions in the SRS resource.

In a possible example, the processing unit 502 configured to determine the frequency-domain positions of the n RBs on each SRS symbol based on the configuration information is configured to: determine frequency-domain position information of m RBs based on the configuration information, where the frequency-domain position information indicates indexes of the m RBs; and determine the frequency-domain positions of the n RBs on each SRS symbol based on the frequency-domain position information.

In a possible example, the frequency-domain positions of the n RBs on each SRS symbol are obtained by: for each of the M SRS symbols, starting with a first SRS symbol, sort the n RBs on each SRS symbol sequentially in an increasing order or a decreasing order of the indexes of the m RBs, where n RBs on the first SRS symbol of the M SRS symbols correspond to n RBs with the lowest or highest index among the m RBs, and n RBs on a second SRS symbol of the M SRS symbols correspond to n RBs with the lowest or highest index other than the n RBs with the lowest or highest index among the m RBs.

In a possible example, the frequency-domain positions of the n RBs on each SRS symbol are obtained by: for each SRS symbol in each group of SRS frequency-hopping transmissions in the SRS resource, starting with a first SRS symbol, sorting the n RBs on each SRS symbol sequentially in an increasing order or a decreasing order of the indexes of the m RBs, where n RBs on the first SRS symbol in each group of SRS frequency-hopping transmissions correspond to n RBs with the lowest or highest index among the m RBs, and n RBs on a second SRS symbol in each group of SRS frequency-hopping transmissions correspond to n RBs with the lowest or highest index other than the n RBs with the lowest or highest index among the m RBs.

In a possible example, the configuration information further includes a first frequency-domain offset; and the first frequency-domain offset represents an offset in a frequency-domain of a frequency-domain starting position of n RBs on a first SRS symbol of the M SRS symbols with a preset reference point or represents an offset in the frequency-domain of a frequency-domain starting position of n RBs on a first SRS symbol in each group of SRS frequency-hopping transmissions with the preset reference point.

In a possible example, the preset reference point is one of: a reference point PointA, one RB with the lowest index among m RBs, a sub-carrier with an index of 0 in one RB with the lowest index among the m RBs, one RB with the lowest index in a bandwidth part (BWP) in which the SRS resource is located, a sub-carrier with an index of 0 in one RB with the lowest index in the BWP in which the SRS resource is located, a common resource block (CRB) with an index of 0, a sub-carrier with an index of 0 in the CRB with the index of 0, or a RB with the lowest index or a sub-carrier with an index of 0 in the RB with the lowest index in SRS frequency-domain resource positions obtained in an SRS non-partial sounding transmission.

In a possible example, the configuration information further includes a second frequency-domain offset; and the second frequency-domain offset represents an offset between a frequency-domain starting position of n RBs on each of two adjacent SRS symbols of the M SRS symbols or represents an offset between a frequency-domain starting position of n RBs on each of two adjacent SRS symbols in each group of SRS frequency-hopping transmissions.

In a possible example, the processing unit 502 configured to determine the frequency-domain positions of the n RBs on each SRS symbol based on the configuration information is configured to: determine the frequency-domain starting position of the n RBs on the first SRS symbol of the M SRS symbols based on the configuration information and the first frequency-domain offset, to obtain a first frequency-domain starting position; and determine a frequency-domain starting position of n RBs on each remaining SRS symbol other than the first SRS symbol of the M SRS symbols based on the first frequency-domain starting position and the second frequency-domain offset.

In a possible example, the processing unit 502 configured to determine the frequency-domain positions of the n RBs on each SRS symbol based on the configuration information is configured to: determine the frequency-domain starting position of the n RBs on the first SRS symbol in each group of SRS frequency-hopping transmissions based on the configuration information and the first frequency-domain offset, to obtain a second frequency-domain starting position; and determine a frequency-domain starting position of n RBs on each remaining SRS symbol other than the first SRS symbol in each group of SRS frequency-hopping transmissions based on the second frequency-domain starting position and the second frequency-domain offset.

In a possible example, the processing unit 502 configured to determine the frequency-domain positions of the n RBs on each SRS symbol based on the configuration information is configured to: determine that the frequency-domain positions of the n RBs on each of the M SRS symbols are consistent with frequency-domain positions of n RBs on a first reference SRS symbol based on the configuration information, where the first reference SRS symbol is one SRS symbol of the M SRS symbols; or determine that the frequency-domain positions of the n RBs on each SRS symbol in each group of SRS frequency-hopping transmissions are consistent with frequency-domain positions of n RBs on a second reference SRS symbol based on the configuration information, where the second reference SRS symbol is one SRS symbol in each group of SRS frequency-hopping transmissions.

In a possible example, the first reference SRS symbol is a first SRS symbol of the M SRS symbols; or the second reference SRS symbol is a first SRS symbol in each group of SRS frequency-hopping transmissions.

Figure 6:
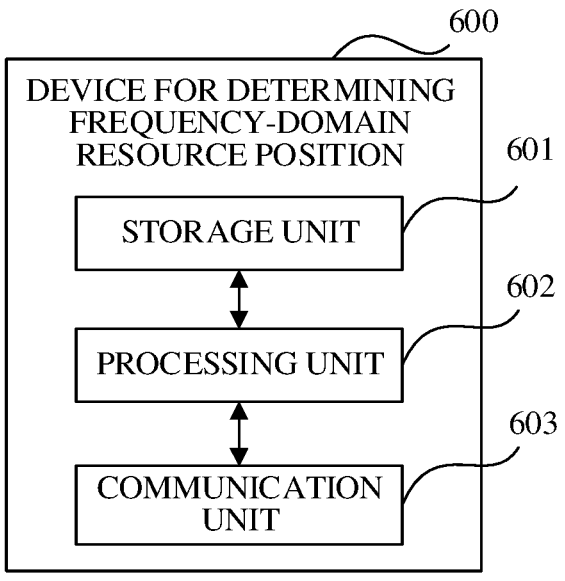
FIG. 6 is another block diagram of functional units of a device for determining a frequency-domain resource position provided in embodiments of the disclosure.

In the case of employing the integrated unit, FIG. 6 provides another block diagram of functional units of a device for determining a frequency-domain resource position provided in embodiments of the disclosure. The device 600 for determining the frequency-domain resource position includes a processing unit 602 and a communication unit 603. The processing unit 602 is used to control and manage the operation of the network device. For example, the processing unit 602 is used to support the network device to perform the steps in FIG. 2 and other procedures for the technical solutions described herein. The communication unit 603 is used to support communication between the network device and other devices in the wireless communication system. The device 600 for determining the frequency-domain resource position may further include a storage unit 601 for storing program codes executed by the device 600 for determining the frequency-domain resource position and transmitted data.

It should be noted that the device 600 for determining the frequency-domain resource position may be a chip or a chip module.

The processing unit 602 may be a processor or a controller, such as a CPU, a general-purpose processor, a DSP, an ASIC, a FPGA, or other programmable logic devices, transistor logic devices, hardware components, or any combination thereof. It may implement or execute various exemplary logic blocks, modules, and circuits described in conjunction with the disclosure of the disclosure. The processing unit 602 may also be a combination that implements computing functions such as a combination of one or more microprocessors, a combination of DSP and microprocessors, and the like. The communication unit 603 may be a communication interface, a transceiver, a transceiver circuit, and the like and the memory unit 601 may be a memory. When the processing unit 602 is a processor, the communication unit 603 is a communication interface, and the storage unit 601 is a memory, the device 600 for determining the frequency-domain resource position of the embodiments of the disclosure may be a network device shown in FIG. 8.

In specific implementation, the processing unit 602 is used to perform any step performed by the network device in the above method embodiment and when data transmission such as sending is performed, the communication unit 603 is optionally invoked to complete the corresponding operation. Details are given below.

The processing unit 602 is configured to: send to a terminal configuration information for an SRS resource, where the configuration information includes L first configuration parameters, each first configuration parameter is used for configuring an SRS partial sounding transmission on the SRS resource of the terminal, L is an integer greater than or equal to 1, and the configuration information is used for determining a frequency-domain position in the SRS resource for transmitting an SRS.

It should be noted that the specific implementation of each operation in the embodiment described in FIG. 6 can be described in detail in the above method embodiments shown in FIG. 2, and will not be repeated herein.

As can be seen, in embodiments of the disclosure, the configuration information for the SRS resource is sent to the terminal, and the configuration information includes the L first configuration parameters and the first configuration parameter is used for configuring the SRS partial sounding transmission on the SRS resource of the terminal. As such, the network device can configure the frequency-domain position for transmitting the SRS in the partial sounding transmission. In addition, the terminal determines based on the configuration information the frequency-domain position in the SRS resource for transmitting the SRS. Because the terminal only needs to perform the SRS partial sounding transmission on the SRS resource, it is beneficial to improving the power spectral density of the transmit power of the SRS, the utilization efficiency and coverage performance of the band resource, and the multiplexing capability of the SRS.

In a possible example, the configuration information further includes a frequency-hopping parameter, and the frequency-hopping parameter is used for configuring enablement or disablement of an SRS frequency-hopping transmission of the terminal on the SRS resource.

In a possible example, the SRS resource includes M orthogonal frequency division multiplexing SRS symbols, and M is an integer; the first configuration parameter is used for configuring n RBs on each of the M SRS symbols which are used for transmitting the SRS, where n=m/p, m is greater than n, m is determined by the frequency-hopping parameter, and p is determined by the first configuration parameter; and the n RBs are consecutive or nonconsecutive in a frequency-domain.

In a possible example, when the SRS frequency-hopping transmission on the SRS resource is enabled and the configuration information further includes a repetition-factor parameter, the SRS resource includes K groups of SRS frequency-hopping transmissions, and K depends on the repetition-factor parameter and M.

In a possible example, at least one group of the K groups of SRS frequency-hopping transmissions includes R SRS symbols, and R depends on the repetition-factor parameter; and the R SRS symbols are consecutive or nonconsecutive in a time-domain.

In a possible example, each of the K groups of SRS frequency-hopping transmissions corresponds to a same first configuration parameter among the L first configuration parameters; or each of the K groups of SRS frequency-hopping transmissions corresponds to a different first configuration parameter among the L first configuration parameters.

In a possible example, each SRS symbol in the SRS resource corresponds to a same first configuration parameter among the L first configuration parameters; or each SRS symbol in the SRS resource corresponds to a different first configuration parameter among the L first configuration parameters.

In a possible example, the SRS partial sounding transmission on the SRS resource and the enablement of the SRS frequency-hopping transmission do not co-exist; or both the SRS partial sounding transmission on the SRS resource and the enablement of the SRS frequency-hopping transmission exist.

In a possible example, the configuration information further includes a first frequency-domain offset; and the first frequency-domain offset represents an offset in a frequency-domain of a frequency-domain starting position of n RBs on a first SRS symbol of the M SRS symbols with a preset reference point or represents an offset in the frequency-domain of a frequency-domain starting position of n RBs on a first SRS symbol in each group of SRS frequency-hopping transmissions with the preset reference point.

In a possible example, where the preset reference point is one of: a reference point PointA, one RB with the lowest index among m RBs, a sub-carrier with an index of 0 in one RB with the lowest index among the m RBs, one RB with the lowest index in a BWP in which the SRS resource is located, a sub-carrier with an index of 0 in one RB with the lowest index in the BWP in which the SRS resource is located, a CRB with an index of 0, a sub-carrier with an index of 0 in the CRB with the index of 0, or a RB with the lowest index or a sub-carrier with an index of 0 in the RB with the lowest index in SRS frequency-domain resource positions obtained in an SRS non-partial sounding transmission.

In a possible example, the configuration information further includes a second frequency-domain offset; and the second frequency-domain offset represents an offset between a frequency-domain starting position of n RBs on each of two adjacent SRS symbols of the M SRS symbols or represents an offset between a frequency-domain starting position of n RBs on each of two adjacent SRS symbols in each group of SRS frequency-hopping transmissions.

Figure 7:
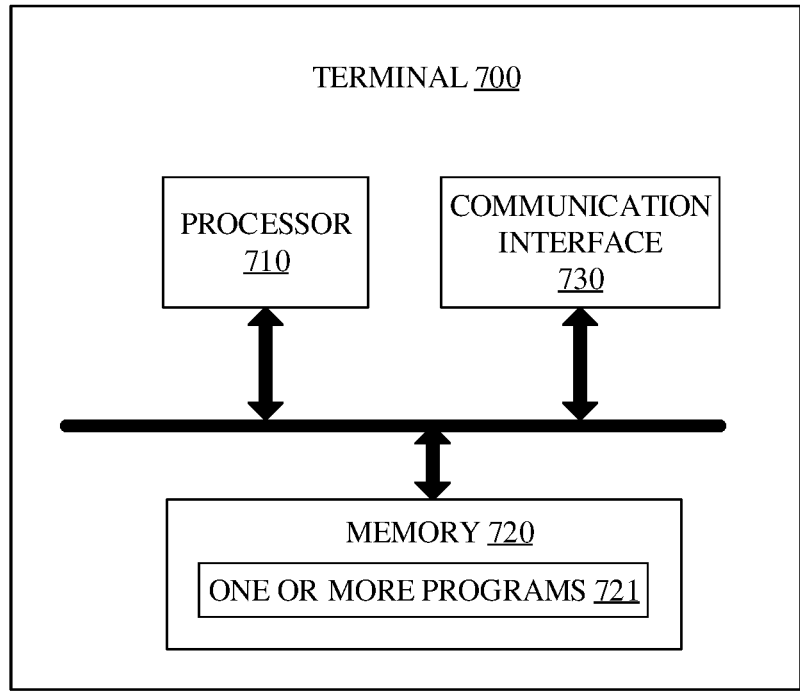
FIG. 7 is a schematic structural diagram of a terminal provided in embodiments of the disclosure.

Referring to FIG. 7, FIG. 7 is a schematic structural diagram of a terminal provided in embodiments of the disclosure. The terminal 700 includes a processor 710, a memory 720, a communication interface 730, and a communication bus for connecting the processor 710, the memory 720, and the communication interface 730.

The memory 720 includes, but is not limited to, a random-access memory (RAM), a read-only memory (ROM), an erasable programmable read-only memory (EPROM), or a compact disc read-only memory (CD-ROM). The memory 720 is used for storing program codes executed by and data transmitted by the terminal 700.

The communication interface 730 is used to receive and transmit data.

The processor 710 may be one or more CPUs and in the case where the processor 710 is one CPU the CPU may be a single-core CPU or a multi-core CPU.

The processor 710 in the terminal 700 is operable to read one or more programs 721 stored in the memory 720 to perform the following operations: obtaining, from a network device, configuration information for an SRS resource, where the configuration information includes L first configuration parameters, each first configuration parameter is used for configuring an SRS partial sounding transmission on the SRS resource of the terminal, and L is an integer greater than or equal to 1; and determining, by the terminal based on the configuration information including the first configuration parameter, a frequency-domain position in the SRS resource for transmitting an SRS.

It should be noted that the specific implementation of each operation can adopt the corresponding description of the above method embodiments shown in FIG. 2, and the terminal 700 can be used to execute the method at the terminal side of the above method embodiments of the disclosure, which will not be described in detail herein.

As can be seen, the configuration information for the SRS resource is received from the network device, and the configuration information includes the L first configuration parameters and the first configuration parameter is used for configuring the SRS partial sounding transmission on the SRS resource of the terminal. As such, the network device can configure the frequency-domain position for transmitting the SRS in the partial sounding transmission. In addition, the terminal determines based on the configuration information the frequency-domain position in the SRS resource for transmitting the SRS. Because the terminal only needs to perform the SRS partial sounding transmission on the SRS resource, it is beneficial to improving the power spectral density of the transmit power of the SRS, the utilization efficiency and coverage performance of the band resource, and the multiplexing capability of the SRS.

Figure 8:
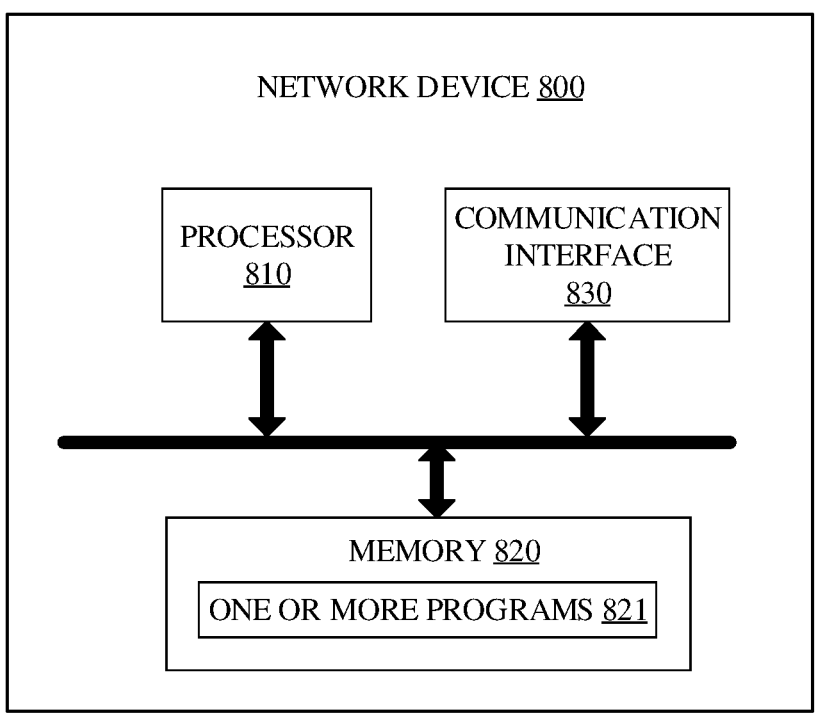
FIG. 8 is a schematic structural diagram of a network device provided in embodiments of the disclosure.

Referring to FIG. 8, FIG. 8 is a schematic structural diagram of a network device provided in embodiments of the disclosure. The network device 800 includes a processor 810, a memory 820, a communication interface 830, and a communication bus for connecting the processor 810, the memory 820, and the communication interface 830.

The memory 820 includes, but is not limited to, a RAM, a ROM, an EPROM, or a CD-ROM. The memory 820 is used for storing program codes executed by and data transmitted by the network device 800.

The communication interface 830 is used to receive and transmit data.

The processor 810 may be one or more CPUs and in the case where the processor 810 is one CPU the CPU may be a single-core CPU or a multi-core CPU.

The processor 810 in the network device 800 is operable to read one or more programs 821 stored in memory 820 to perform the following operations: sending, to a terminal, configuration information for an SRS resource, where the configuration information includes L first configuration parameters, each first configuration parameter is used for configuring an SRS partial sounding transmission on the SRS resource of the terminal, L is an integer greater than or equal to 1, and the configuration information is used for determining a frequency-domain position in the SRS resource for transmitting an SRS.

It should be noted that the specific implementation of each operation can adopt the corresponding description of the above method embodiments shown in FIG. 2, and the network device 800 can be used to execute the method at the network device side of the above method embodiments of the disclosure, which will not be described in detail herein.

As can be seen, the configuration information for the SRS resource is sent to the terminal, and the configuration information includes the L first configuration parameters and the first configuration parameter is used for configuring the SRS partial sounding transmission on the SRS resource of the terminal. As such, the network device can configure the frequency-domain position for transmitting the SRS in the partial sounding transmission. In addition, the terminal determines based on the configuration information the frequency-domain position in the SRS resource for transmitting the SRS. Because the terminal only needs to perform the SRS partial sounding transmission on the SRS resource, it is beneficial to improving the power spectral density of the transmit power of the SRS, the utilization efficiency and coverage performance of the band resource, and the multiplexing capability of the SRS.

Embodiments of the disclosure further provide a non-transitory computer-readable storage medium. The computer-readable storage medium stores a computer program for electronic data interchange. The computer program causes a computer to perform some or all of the steps as described in the terminal or network device in the method embodiments described above.

Embodiments of the disclosure further provide a computer program product. The computer program product includes a computer program. The computer program is operable to cause a computer to perform some or all of the steps as described in the terminal or network device in the method embodiments described above. The computer program product can be a software installation package.

In the above embodiments, the embodiments of the disclosure have their own emphasis on the description of each embodiment, and for parts not detailed in one embodiment, reference can be made to the related description of other embodiments.

The steps of the method or algorithm described in embodiments of the disclosure may be implemented in the form of hardware or in the form of the processor executing software instructions. The software instructions may be composed of corresponding software modules, which may be stored in RAM, flash memory, ROM, EPROM, electrically erasable programmable read only memory (EEPROM), registers, hard disk, removable hard disk, CD-ROM, or any other form of storage medium well known in the art. An exemplary storage medium is coupled to a processor to enable the processor to read information from and write information to the storage medium. Apparently, the storage medium can also be a part of the processor. The processor and storage medium may be located in the ASIC. In addition, the ASIC may be located in the terminal or the network device. Apparently, the processor and the storage medium may also exist as separate components in the terminal or network device.

Those skilled in the art will appreciate that in one or more of the above examples, the functions described in embodiments of the disclosure may be implemented in whole or in part by software, hardware, firmware, or any combination thereof. When implemented in software, it can be implemented in whole or in part in the form of a computer program product. The computer program product includes one or more computer instructions. When the computer program instructions are loaded and executed on a computer, the flow or function described in accordance with embodiments of the disclosure is generated in whole or in part. The computer may be a general-purpose computer, a specific purpose computer, a computer network, or other programmable device. The computer instructions may be stored in a computer-readable storage medium or transmitted from one computer-readable storage medium to another. For example, the computer instructions may be transmitted from one Web site, computer, server, or data center to another Web site, computer, server, or data center via wired (e.g., coaxial cable, optical fiber, digital subscriber line (DSL)) or wireless (e.g., infrared, wireless, microwave, etc.) manner. The computer-readable storage medium may be any usable medium accessible to a computer or a data storage device such as a server, data center, etc. containing one or more usable media. The usable medium may be a magnetic medium (e.g., a floppy disk, hard disk, magnetic tape), an optical medium (e.g., a digital video disc (DVD)), or a semiconductor medium (e.g., a solid state disk (SSD)), etc.

The various devices, products described in the above embodiments include various modules/units, which may be software modules/units, hardware modules/units, or may be partially software modules/units and partially hardware modules/units. For example, for each device or product applied to or integrated in a chip, each module/unit contained therein may be implemented in the form of hardware such as a circuit, or at least part of the module/units may be implemented in the form of a software program, which runs on the processor integrated inside the chip, and the remaining (if any) part of the module/units may be implemented in the form of hardware such as a circuit. For each device or product applied to or integrated in the chip module, each module/unit contained therein may be implemented in the form of hardware such as circuit, and different modules/units may be located in the same component (e.g., chip, circuit module, etc.) or in different components of the chip module, or at least part of the modules/units may be implemented in the form of a software program, which runs on the processor integrated inside the chip module, and the remaining (if any) part of the modules/units may be implemented in the form of hardware such as circuit. For each device or product applied to or integrated in the terminal, each module/unit contained therein may be implemented in hardware such as circuit, and different modules/units may be located in the same component (e.g., chip, circuit module, etc.) or in different components in the terminal, or at least part of the modules/units may be implemented in the form of a software program, which runs on the processor integrated in the terminal, and the remaining (if any) part of the modules/units may be implemented in hardware such as circuit.

The above detailed description of the purpose, technical solution, and advantageous effect of the embodiments of the disclosure is further detailed. It should be understood that the above is only the specific implementation of the embodiments of the disclosure, and is not used to limit the scope of protection of the embodiments of the disclosure. Any modification, equivalent, improvement, and the like made based on the technical solutions of the embodiments of the disclosure should be included in the scope of protection of the embodiments of the disclosure.

What is claimed is:

1. A method for determining a frequency-domain resource position, comprising:

obtaining, by a terminal, configuration information for a sounding reference signal (SRS) resource, the configuration information comprising L first configuration parameters, each first configuration parameter being used for configuring an SRS partial sounding transmission on the SRS resource of the terminal, and L being an integer greater than or equal to 1; and determining, by the terminal based on the configuration information comprising the first configuration parameter, a frequency-domain position in the SRS resource for transmitting an SRS, wherein the configuration information further comprises a frequency-hopping parameter, and the frequency-hopping parameter is used for configuring enablement or disablement of an SRS frequency-hopping transmission of the terminal on the SRS resource, and wherein the SRS resource comprises M SRS symbols, and M is an integer, the first configuration parameter is used for configuring n resource blocks (RBs) on each of the M SRS symbols which are used for transmitting the SRS, wherein $n=m/p$, m is greater than n, m depends on the frequency-hopping parameter, and p depends on the first configuration parameter, and the n RBs are consecutive or nonconsecutive in a frequency-domain, and wherein:

when the SRS frequency-hopping transmission on the SRS resource is enabled and the configuration information further comprises a repetition-factor parameter, the SRS resource comprises K groups of SRS frequency-hopping transmissions, and K depends on the repetition-factor parameter and M.

2. The method of claim 1, wherein at least one group of the K groups of SRS frequency-hopping transmissions comprises R SRS symbols, and R depends on the repetition-factor parameter; and the R SRS symbols are consecutive or nonconsecutive in a time-domain.

3. The method of claim 1, wherein each of the K groups of SRS frequency-hopping transmissions corresponds to a same first configuration parameter among the L first configuration parameters; or each of the K groups of SRS frequency-hopping transmissions corresponds to a different first configuration parameter among the L first configuration parameters.

4. The method of claim 1, wherein each SRS symbol in the SRS resource corresponds to a same first configuration parameter among the L first configuration parameters; or each SRS symbol in the SRS resource corresponds to a different first configuration parameter among the L first configuration parameters.

5. The method of claim 1, wherein the SRS partial sounding transmission on the SRS resource and the enablement of the SRS frequency-hopping transmission do not co-exist; or both the SRS partial sounding transmission on the SRS resource and the enablement of the SRS frequency-hopping transmission exist.

6. The method of claim 1, wherein determining, based on the configuration information comprising the first configuration parameter, the frequency-domain position in the SRS resource for transmitting the SRS comprises:

determining, by the terminal based on the configuration information, frequency-domain positions of the n RBs on each SRS symbol for transmitting the SRS, wherein each SRS symbol comprises: each SRS symbol of the M SRS symbols in the SRS resource or each SRS symbol in each group of SRS frequency-hopping transmissions in the SRS resource.

7. The method of claim 6, wherein determining the frequency-domain positions of the n RBs on each SRS symbol based on the configuration information comprises:

determining, by the terminal, frequency-domain position information of m RBs based on the configuration information, wherein the frequency-domain position information indicates indexes of the m RBs; and determining, by the terminal, the frequency-domain positions of the n RBs on each SRS symbol based on the frequency-domain position information.

8. The method of claim 7, wherein the frequency-domain positions of the n RBs on each SRS symbol are obtained by:

for each of the M SRS symbols, starting with a first SRS symbol, sorting the n RBs on each SRS symbol sequentially in an increasing order or a decreasing order of the indexes of the m RBs, wherein n RBs on the first SRS symbol of the M SRS symbols correspond to n RBs with the lowest or highest index among the m RBs, and n RBs on a second SRS symbol of the M SRS symbols correspond to n RBs with the lowest or highest index other than the n RBs with the lowest or highest index among the m RBs.

9. The method of claim 7, wherein the frequency-domain positions of the n RBs on each SRS symbol are obtained by:

for each SRS symbol in each group of SRS frequency-hopping transmissions in the SRS resource, starting with a first SRS symbol, sorting the n RBs on each SRS symbol sequentially in an increasing order or a decreasing order of the indexes of the m RBs, wherein n RBs on the first SRS symbol in each group of SRS frequency-hopping transmissions correspond to n RBs with the lowest or highest index among the m RBs, and n RBs on a second SRS symbol in each group of SRS frequency-hopping transmissions correspond to n RBs with the lowest or highest index other than the n RBs with the lowest or highest index among the m RBs.

10. The method of claim 6, wherein the configuration information further comprises a first frequency-domain offset; and the first frequency-domain offset represents an offset in a frequency-domain of a frequency-domain starting position of n RBs on a first SRS symbol of the M SRS symbols with a preset reference point or represents an offset in the frequency-domain of a frequency-domain starting position of n RBs on a first SRS symbol in each group of SRS frequency-hopping transmissions with the preset reference point.

11. The method of claim 10, wherein the preset reference point is one of: a reference point PointA, one RB with the lowest index among m RBs, a sub-carrier with an index of 0 in one RB with the lowest index among the m RBs, one RB with the lowest index in a bandwidth part (BWP) in which the SRS resource is located, a sub-carrier with an index of 0 in one RB with the lowest index in the BWP in which the SRS resource is located, a common resource block (CRB) with an index of 0, a sub-carrier with an index of 0 in the CRB with the index of 0, or a RB with the lowest index or a sub-carrier with an index of 0 in the RB with the lowest index in SRS frequency-domain resource positions obtained in an SRS non-partial sounding transmission.

12. The method of claim 10, wherein the configuration information further comprises a second frequency-domain offset; and the second frequency-domain offset represents an offset between a frequency-domain starting position of n RBs on each of two adjacent SRS symbols of the M SRS symbols or represents an offset between a frequency-domain starting position of n RBs on each of two adjacent SRS symbols in each group of SRS frequency-hopping transmissions.

13. The method of claim 12, wherein determining the frequency-domain positions of the n RBs on each SRS symbol based on the configuration information comprises:

determining, by the terminal, the frequency-domain starting position of the n RBs on the first SRS symbol of the M SRS symbols based on the configuration information and the first frequency-domain offset, to obtain a first frequency-domain starting position; and determining, by the terminal, a frequency-domain starting position of n RBs on each remaining SRS symbol other than the first SRS symbol of the M SRS symbols based on the first frequency-domain starting position and the second frequency-domain offset.

14. The method of claim 12, wherein determining the frequency-domain positions of the n RBs on each SRS symbol based on the configuration information comprises:

determining, by the terminal, the frequency-domain starting position of the n RBs on the first SRS symbol in each group of SRS frequency-hopping transmissions based on the configuration information and the first frequency-domain offset, to obtain a second frequency-domain starting position; and determining, by the terminal, a frequency-domain starting position of n RBs on each remaining SRS symbol other than the first SRS symbol in each group of SRS frequency-hopping transmissions based on the second frequency-domain starting position and the second frequency-domain offset.

15. The method of claim 6, wherein determining the frequency-domain positions of the n RBs on each SRS symbol based on the configuration information comprises:

determining, by the terminal, that the frequency-domain positions of the n RBs on each of the M SRS symbols are consistent with frequency-domain positions of n RBs on a first reference SRS symbol based on the configuration information, wherein the first reference SRS symbol is one SRS symbol of the M SRS symbols; or determining, by the terminal, that the frequency-domain positions of the n RBs on each SRS symbol in each group of SRS frequency-hopping transmissions are consistent with frequency-domain positions of n RBs on a second reference SRS symbol based on the configuration information, wherein the second reference SRS symbol is one SRS symbol in each group of SRS frequency-hopping transmissions.

16. A terminal comprising a processor and a memory coupled to the processor and storing one or more programs, the one or more programs being configured to be executed by the processor to:

obtain configuration information for a sounding reference signal (SRS) resource, the configuration information comprising L first configuration parameters, each first configuration parameter being used for configuring an SRS partial sounding transmission on the SRS resource of the terminal, and L being an integer greater than or equal to 1; and determine, based on the configuration information comprising the first configuration parameter, a frequency-domain position in the SRS resource for transmitting an SRS, wherein the configuration information further comprises a frequency-hopping parameter, and the frequency-hopping parameter is used for configuring enablement or disablement of an SRS frequency-hopping transmission of the terminal on the SRS resource, and wherein the SRS resource comprises M SRS symbols, and M is an integer, the first configuration parameter is used for configuring n resource blocks (RBs) on each of the M SRS symbols which are used for transmitting the SRS, wherein n=m/p, m is greater than n, m depends on the frequency-hopping parameter, and p depends on the first configuration parameter, and the n RBs are consecutive or nonconsecutive in a frequency-domain, and wherein:

when the SRS frequency-hopping transmission on the SRS resource is enabled and the configuration information further comprises a repetition-factor parameter, the SRS resource comprises K groups of SRS frequency-hopping transmissions, and K depends on the repetition-factor parameter and M.

17. A non-transitory computer-readable storage medium storing a computer program, which when executed by a terminal causes the terminal to:

obtain configuration information for a sounding reference signal (SRS) resource, the configuration information comprising L first configuration parameters, each first configuration parameter being used for configuring an SRS partial sounding transmission on the SRS resource of the terminal, and L being an integer greater than or equal to 1; and determine, based on the configuration information comprising the first configuration parameter, a frequency-domain position in the SRS resource for transmitting an SRS, wherein the configuration information further comprises a frequency-hopping parameter, and the frequency-hopping parameter is used for configuring enablement or disablement of an SRS frequency-hopping transmission of the terminal on the SRS resource, and wherein the SRS resource comprises M SRS symbols, and M is an integer, the first configuration parameter is used for configuring n resource blocks (RBs) on each of the M SRS symbols which are used for transmitting the SRS, wherein $n=m/p$, m is greater than n, m depends on the frequency-hopping parameter, and p depends on the first configuration parameter, and the n RBs are consecutive or nonconsecutive in a frequency-domain, and wherein:

when the SRS frequency-hopping transmission on the SRS resource is enabled and the configuration information further comprises a repetition-factor parameter, the SRS resource comprises K groups of SRS frequency-hopping transmissions, and K depends on the repetition-factor parameter and M.

* * * * *